US008736760B2

(12) United States Patent
Ohki

(10) Patent No.: US 8,736,760 B2
(45) Date of Patent: *May 27, 2014

(54) PICTURE PROCESSING APPARATUS, PICTURE PROCESSING METHOD, PICTURE DATA STORAGE MEDIUM AND COMPUTER PROGRAM

(71) Applicant: Sony Corporation, Tokyo (JP)

(72) Inventor: Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/868,800

(22) Filed: Apr. 23, 2013

(65) Prior Publication Data
US 2013/0308049 A1    Nov. 21, 2013

Related U.S. Application Data

(63) Continuation of application No. 12/050,549, filed on Mar. 18, 2008, now Pat. No. 8,451,374, which is a continuation of application No. 10/636,802, filed on Aug. 7, 2003, now Pat. No. 7,430,015.

(30) Foreign Application Priority Data

Aug. 23, 2002  (JP) ................ 2002-243849

(51) Int. Cl.
*H04N 7/01*    (2006.01)
(52) U.S. Cl.
USPC ............................ 348/459; 348/441; 348/447
(58) Field of Classification Search
USPC ................ 348/459, 441, 447, 443, 452, 429, 348/E5.11, E5.111; 386/1, 131; 375/240.12, 240.25, 240.16
IPC ........................................................ H04N 7/01
See application file for complete search history.

(56) References Cited

FOREIGN PATENT DOCUMENTS

JP      11-266457    9/1999
WO      97/28507     9/1997

*Primary Examiner* — Trang U Tran
(74) *Attorney, Agent, or Firm* — K&L Gates LLP

(57) ABSTRACT

In an apparatus and a method for executing generation and reproduction processing of picture data suitable for picture display devices having differing processable frame rates, low frame rate picture data is generated on the basis of a plurality of temporally continuous pictures having a high frame rate to provide picture data having a plurality of layers. Decimated data may be set as the high frame rate layer data. In this manner, the quantity of data to be transmitted or stored is reduced.

11 Claims, 33 Drawing Sheets

F I G. 25
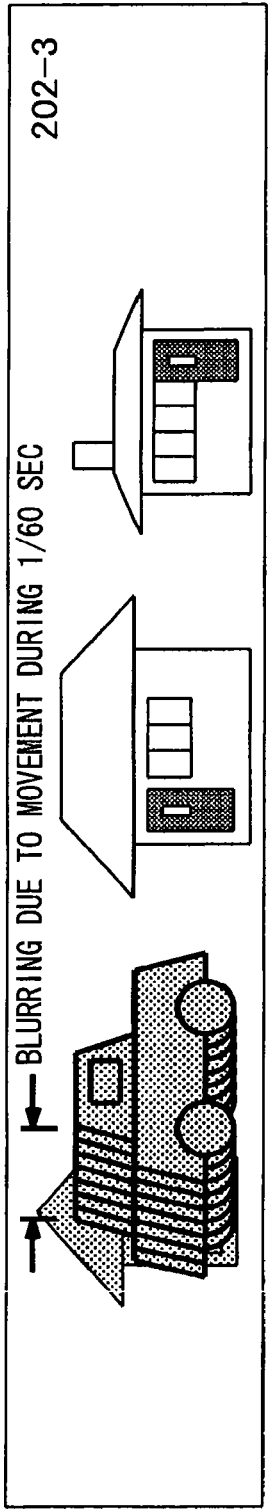
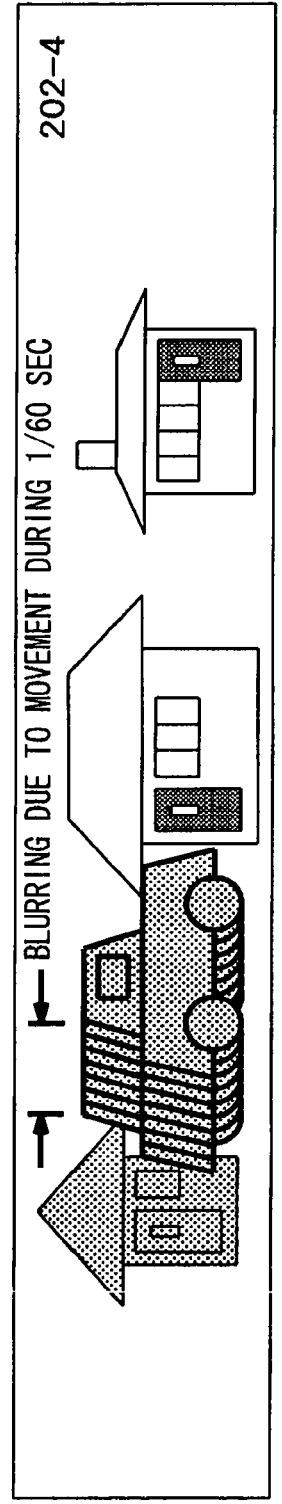

F I G. 29
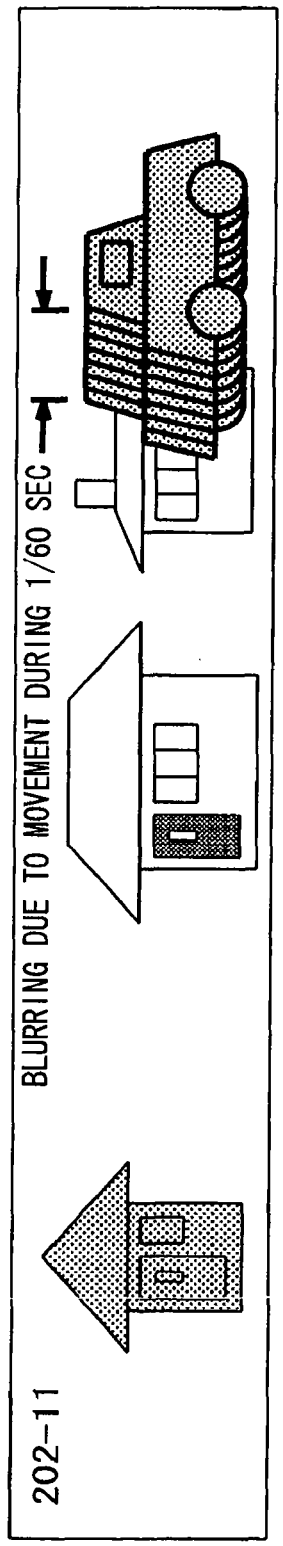
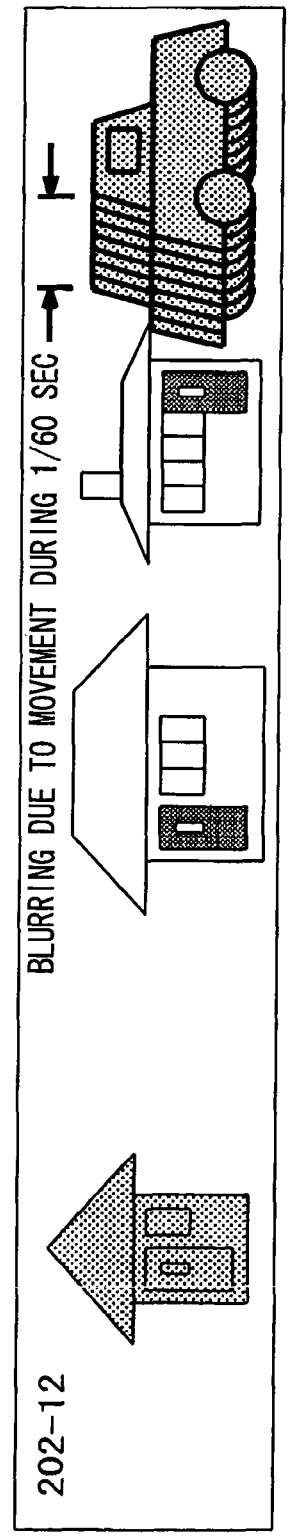

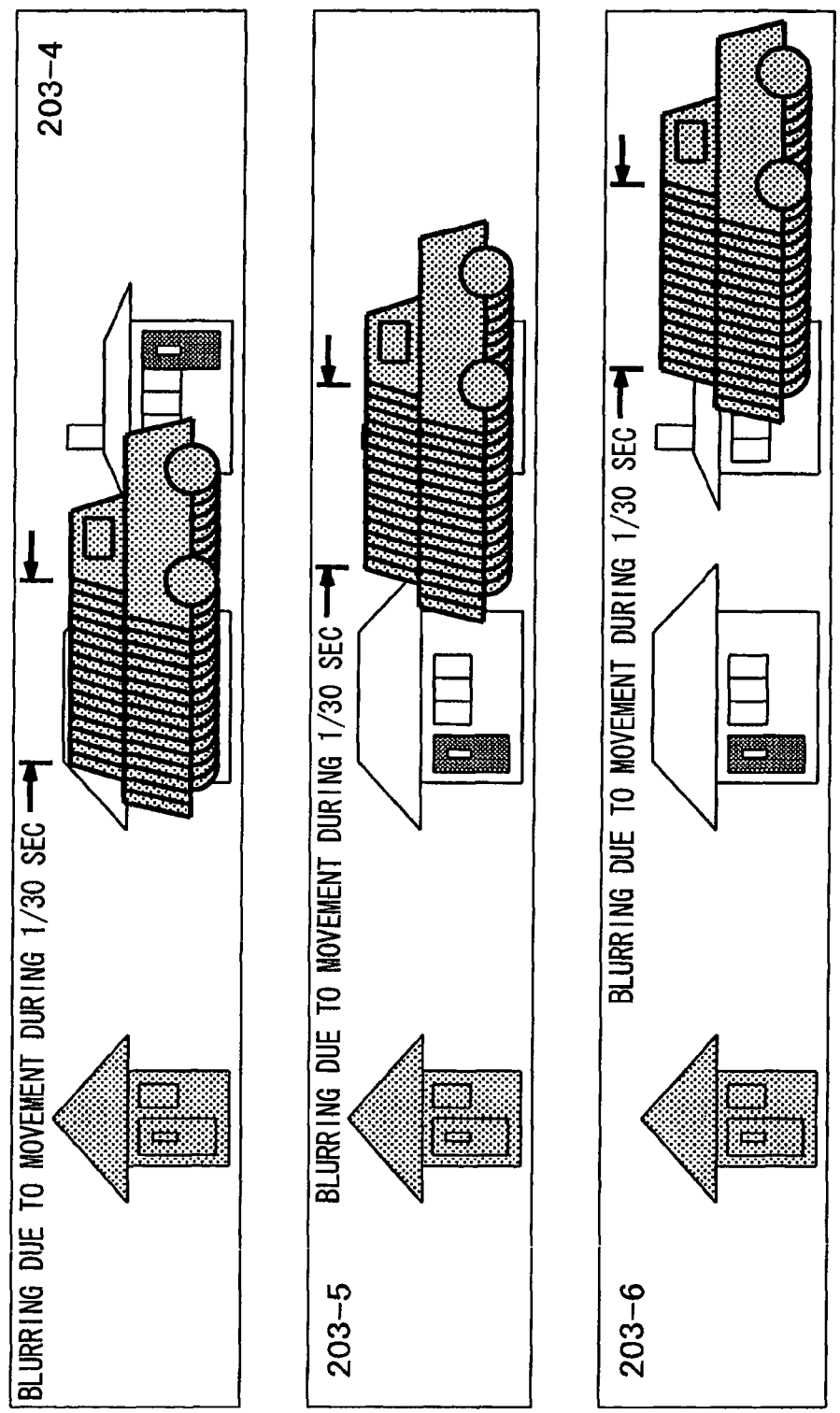

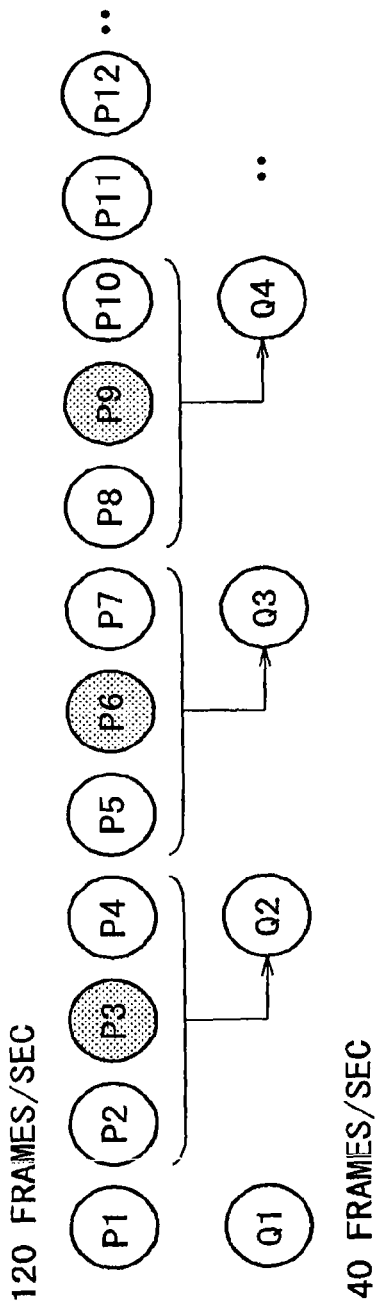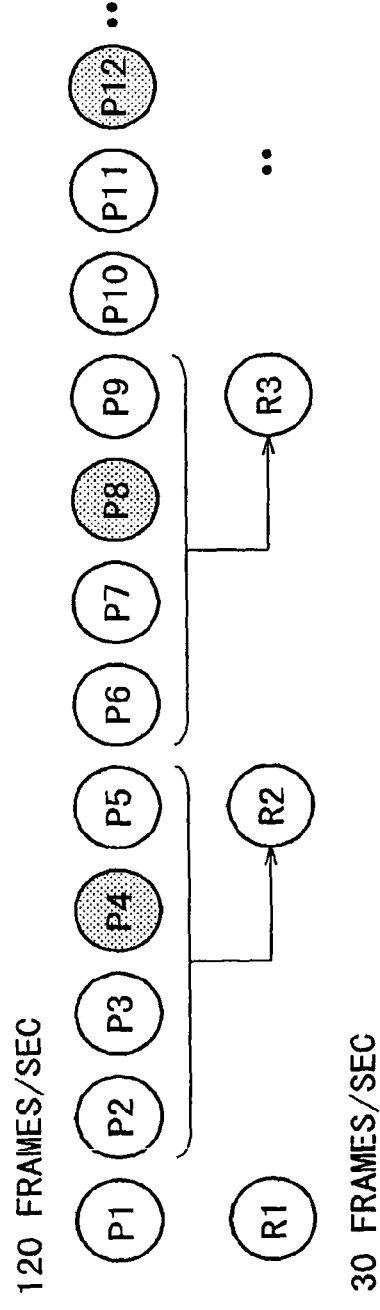

PICTURE PROCESSING APPARATUS, PICTURE PROCESSING METHOD, PICTURE DATA STORAGE MEDIUM AND COMPUTER PROGRAM

CROSS-REFERENCE TO RELATED APPLICATIONS

The present application is a continuation application of U.S. patent application Ser. No. 12/050,549, filed on Mar. 18, 2008, which claims priority to U.S. patent application Ser. No. 10/636,802, filed on Aug. 7, 2003, which claims priority to Japanese Patent Application 2002-243849, filed on Aug. 23, 2002, the entire contents of which are incorporated herein by reference.

TECHNICAL FIELD

The present invention generally relates to a picture processing apparatus, a picture processing method, a picture data storage medium and a computer program. More particularly, the present invention relates to a picture processing apparatus, a picture processing method, a picture data storage medium and a computer program which generate picture data to be displayed on various display devices supporting different frame rates and which make it possible to display pictures at the optimum frame rate for each of the display devices.

BACKGROUND

As total systems for filming and displaying moving images, the National Television System Committee (NTSC) system is adopted in the United States of America and Japan, and the Phase Alternating Line (PAL) system is adopted in Europe. In recent years, the High Definition (HD) system, in which the number of pixels per frame is greater, is beginning to become more prevalent. In these moving picture systems, about 25 to 60 pictures are displayed per second. Since these pictures are continuously displayed, the filmed subject appears to move on the display to the human eye.

Moreover, as the Internet has become more pervasive, it has become more commonplace to distribute moving picture data over the Internet, and for individual users to receive them and display them on a display device, such as the display of a personal computer (PC) or the like. In order to distribute data in such a manner, compression is performed since moving picture data are generally massive. Common compression systems include Moving Picture Experts Group Phase 2 (MPEG-2) (ISO/IEC 13818-2) and Moving Picture Experts Group Phase 4 (MPEG-4) (ISO/IEC 14496-2). An outline of MPEG-2 is disclosed in, for example, "Point Zukaishiki, Saishin MPEG Kyoukasho (The Point-Illustrated Newest MPEG Textbook)" written by Hiroshi Fujiwara, ISBN 4-7561-0247-6, and the like.

A detailed description of MPEG-4 can be found in, for example, "MPEG-4 no Subete (Everything About MPEG-4)" published by Kogyo Chosakai Publishing Co., Ltd., ISBN 4-7693-1167-2. However, since there are differences in the processable, that is, displayable, data rates depending on the display devices from user to user, standards accommodating such cases are also described in the standards of MPEG-4. In other words, a system in which moving picture data is divided into several layers to be compressed and transmitted (or stored) is defined. This is generally referred to as scalability, which is described in detail below.

On the data transmitting end, a low resolution moving picture is first generated from an original high resolution moving picture, and the generated low resolution moving picture is compressed and transmitted in a first layer as "low resolution compressed moving picture data." Moreover, the difference data between the original high resolution moving picture and the low resolution moving picture, which has been generated on the basis of the original high resolution moving picture, is compressed in a second layer as "compressed difference data between the original high resolution moving picture and the low resolution moving picture."

On the data receiving end, when the processable data rate is low, only the first layer, that is the "low resolution compressed moving picture data," is received and the data of the second layer is ignored. The picture display device, which has received the first layer moving picture data, that is, the low resolution moving picture data, decompresses the received first layer compressed moving picture data, that is, the low resolution compressed moving picture data, and is thus able to display a low resolution moving picture.

On the other hand, when the processable data rate is high on the receiving end and data input with a huge data rate can be received, both the data in the first layer and the second layer, that is, both the "low resolution compressed moving picture data" and the "compressed difference data between the original high resolution moving picture and the low resolution moving picture," are received.

On the receiving end, which has received the data, first, the data in the first layer is decompressed, and the low resolution moving picture is restored. Then, the data in the second layer is decompressed, and the difference data between the "original high resolution moving picture" and the "low resolution moving picture" is restored. Furthermore, the "high resolution moving picture" is restored based on the restored "low resolution moving picture" and the "difference data between the 'original high resolution moving picture' and the 'low resolution moving picture.'" By having the restored "high resolution moving picture" displayed, users are able to enjoy the original high resolution moving picture.

Thus, by performing the respective processes depending on whether the processable data rate of the display device is low or high, it is made possible to watch a low resolution moving picture or a high resolution moving picture. The description above pertains to a process based on the difference in scalability in the spatial direction, that is, scalability in terms of the number of pixels constituting a frame.

Temporal scalability is also standardized. On the data transmitting end, a low frame rate moving picture is first generated from an original high frame rate moving picture by decimation, and the generated low frame rate moving picture is compressed and is then transmitted as "low frame rate compressed moving picture data" in a first layer. Moreover, the difference data between the original high frame rate moving picture and the low frame rate moving picture, namely the frames that were decimated, is compressed and is then transmitted as "compressed difference data between the original high frame rate moving picture and the low frame rate moving picture" in a second layer.

On the receiving end, when the processable data rate of the data receiving end is low, only the data in the first layer, that is, the "low frame rate compressed moving picture data," is received, and the data in the second layer is ignored. Moreover, the data in the first layer, that is, the low frame rate compressed moving picture data, is decompressed, thereby making it possible to display the low frame rate moving picture.

On the other hand, when the processable data rate of the data receiving end is high and massive data can be received, both the data in the first layer, that is, the "low frame rate compressed moving picture data," and the data in the second layer, that is, the "difference data between the original high frame rate moving picture and the low frame rate moving picture" are received.

Next, the data in the first layer is decompressed, and the low frame rate moving picture is restored. Then, the data in the second layer is decompressed, and the difference data between the "original high frame rate moving picture" and the "low frame rate moving picture" is restored. Furthermore, the "high frame rate moving picture" is restored based on the restored "low frame rate moving picture" and the "difference data of the 'original high frame rate moving picture' and the 'low frame rate moving picture.'" By having the restored "high frame rate moving picture" displayed, users are able to enjoy the original high frame rate moving picture. Thus, by performing the respective processes depending on whether the processable frame rate of the display device is low or high, it is made possible to watch a low frame rate moving picture or a high frame rate moving picture.

In addition to temporal and spatial scalability, systems for realizing other kinds of scalability such as SNR scalability, content scalability and the like have already been proposed. For example, there are a system that uses quantization errors in an enhancement layer, a system that uses, in an enhancement layer, object information which does not exist in a base layer, and the like. Moreover, it is possible to use temporal, spatial and other scalabilities with various modifications. Moreover, it is also possible to use temporal, spatial and other scalabilities in combination as deemed appropriate (see for example, Japanese Patent Application Publication Number 1999-266457, International Publication Number WO97/28507, and the like, the contents of which are hereby incorporated by reference).

The present invention relates particularly to a system including at least an existing version or any modified version of temporal scalability. Accordingly, scalability in the temporal direction will be further described with concrete examples. It is assumed in this example, for purposes of illustration, that an original high frame rate moving picture is a moving picture taken at a frame speed of 120 frames/sec. Naturally, each picture is taken in $\frac{1}{120}$ of a second. In other words, the exposure time of each picture is $\frac{1}{120}$ seconds. A low frame rate moving picture is generated from this moving picture. For example, three out of four consecutive pictures are discarded, and only the remaining one picture is kept. Thus, a moving picture of 30 frames/sec can be generated. This process is described below using FIG. 1.

In FIG. 1, the horizontal axis indicates time (sec). A picture group 101 indicates a group of frames of an original high frame rate moving picture. FIG. 1 shows thirteen picture frame data 101-1 to 101-13 of the picture group 101. The picture frame data 101-1 is the data of the first picture of the moving picture. As shown in FIG. 1, the picture frame data 101-1 is the data of a picture generated through exposure during the first $\frac{1}{120}$ seconds (between the 0th seconds and the $\frac{1}{120}$th second in FIG. 1). The picture data 101-2 is the data of the second picture, which is generated through exposure during the subsequent $\frac{1}{120}$ seconds (from the $\frac{1}{120}$th second to the $\frac{2}{120}$th second in FIG. 1). The picture frame data 101-3 and the subsequent picture frame data are generated in a similar manner, and are consecutive high frame rate picture frame data whose exposure time is set at $\frac{1}{120}$ seconds.

Moreover, in FIG. 1, a picture group 102 is a group of frames of a low frame rate moving picture produced by decimating pictures from the picture group 101. Picture frame data 102-1 is the first picture data of this moving picture, and is exactly the same as the picture frame data 101-1 of the picture group 101. Picture data 102-2 is the second picture frame data, and is exactly the same as the picture frame data 101-5 in the picture group 101. The same goes to picture frame data 102-3 and the subsequent picture frame data, and picture frame data 102-$n$ is exactly the same as the picture frame data 101-(4×n−3) in the picture group 101.

In FIG. 1, a picture group 103 is a group of pictures that were decimated in generating the low frame rate picture group 102 from the high frame rate picture group 101. In other words, the picture group 103 includes the picture data 101-2, 101-3, 101-4, 101-6, 101-7, 101-8, ..., 101-(4×n−2), 101-(4×n−1), 101-(4×n), and so forth.

On the data transmitting end, the low frame rate moving picture shown in the picture group 102 is compressed and transmitted as first layer data. Moreover, the picture group 103, that is, the picture group including the pictures that were decimated in generating the low frame rate picture group 102 from the high frame rate picture group 101, is compressed and transmitted as second layer data.

The processing on a picture data receiving end will be described. First, the processing on a picture data receiving end where displaying is performed by a display device having the capability to display only at 30 frames/sec will be described. In this case, only the data transmitted in the first layer, that is, the low frame rate moving picture shown as the picture group 102, is received and is decompressed to restore the low frame rate (30 frames/sec) moving picture shown as the picture group 102. Then, by displaying the restored moving picture, it becomes possible to display the low frame rate (30 frames/sec) moving picture.

Next, the processing on a picture data receiving end where displaying is performed by a display device having the capability to display at 120 frames/sec will be described. In this case, both the data transmitted in the first layer and the data transmitted in the second layer are received. In other words, both the low frame rate moving picture shown as the picture group 102, and the picture group 103 of the pictures that were decimated in generating the low frame rate picture group 102 from the high frame rate picture group 101 are received.

In processing the received data, the data transmitted in the first layer is decompressed and the low frame rate (30 frames/sec) moving picture shown as the picture group 102 is restored. Next, the data transmitted in the second layer is decompressed and the picture group 103 is restored. Then, the restored moving pictures of the picture groups 102 and 103 are combined to generate the picture group 101. Then, this picture group 101 is displayed at a frame rate of 120 frames/sec. By the process described above, it becomes possible to display the moving picture at the high frame rate, that is, at a frame rate of 120 frames/sec.

Thus, a user having only a display device whose processable frame rate is low may display the low frame rate moving picture, while a user having a display device whose processable frame rate is high may display the high frame rate moving picture. When data is transmitted in a hierarchical structure having temporal scalability, even a user having a display device of an inferior frame rate can display a moving picture, albeit with a lower frame rate. This is one advantage of transmitting data with a hierarchical structure having temporal scalability.

SUMMARY

As described above, a system in which a decimated moving picture is displayed depending on the maximum frame rate that is displayable by a display device on the receiving end does already exist. However, there is a problem related to picture processing that uses this technique. A problem in a case where the receiving end has capabilities of displaying, for example, at 30 frames/sec will be described with respect to the example above.

The displayed moving picture would be the moving picture shown as the low frame rate picture group 102. The moving picture is one in which one picture is taken at a high speed of $1/120$ seconds, and information during the succeeding $3/120$ seconds is not recorded at all, and then a picture is taken at a high speed of $1/120$ seconds, and information during the succeeding $3/120$ seconds is not recorded at all, and so forth. When such a moving picture is displayed on a display device, smoothness of motion is lost.

This results from the fact that pictures taken in durations of $1/120$ seconds are used as pictures to be displayed in durations of $1/30$ seconds. In order to maintain the smoothness of a displayed moving picture, it is necessary to use a frame rate matching the displaying capabilities of the display device. For example, if a display device having displaying capabilities of only 30 frames/sec is used on the receiving end, it is necessary to use a moving picture taken continuously in durations of $1/30$ seconds in order to maintain the smoothness of the moving picture.

Concrete examples are described below with reference to FIGS. 2 through 9. The moving picture shown in FIGS. 2 through 7 is one in which a vehicle moving at high speed from the left to the right is filmed. Each picture of the moving picture is designated by the same picture frame data numbers of 101-1 to 101-24 as in FIG. 1. Each picture frame data is taken with an exposure time of $1/120$ seconds.

Each of the pictures is shown as an elongate picture. However, this is only so because of the shape of the paper on which the pictures are drawn, and ordinarily, the aspect ratio of each picture is, for example, 3:4. Moreover, since each picture is taken with an exposure time of $1/120$ seconds, motion blur (blurring due to the movements of a subject) of an amount corresponding to the distance the vehicle has moved during $1/120$ seconds is present. Although, in reality, the outline of the vehicle, for example, would become blurred due to motion blur, in these drawings, the outline of the vehicle is drawn clearly so as to make the drawings easier to view.

A picture display device having a high frame rate display processing capability of 120 frames/sec can display smooth movements by displaying the picture frame data 101-1 to 101-24 shown in FIGS. 2 through 7 by sequentially switching them every $1/120$ of a second.

On the other hand, on a receiving end having a display device with a display capability of only 30 frames/sec, only the remaining pictures after decimation of the high frame rate picture frame data of 120 frames/sec are displayed as described above. In other words, as shown in FIGS. 8 and 9, only the picture frame data 102-1, 102-2, 102-3, . . . are displayed in durations of $1/30$ seconds.

In other words, only the picture data 101-1, 101-5, 101-9, . . . in the picture group 101 of FIG. 1 are displayed. As shown in FIGS. 8 and 9, this makes the movement of the vehicle become discontinuous. In other words, in FIGS. 8 and 9, no information of when the vehicle is advancing from display position 51 of the vehicle in the picture frame data 102-1 to display position S2 of the vehicle in the picture frame data 102-2, from display position S3 of the vehicle in the picture frame data 102-2 to display position S4 of the vehicle in the picture frame data 102-3, from display position S5 of the vehicle in the picture frame data 102-3 to display position S6 of the vehicle in the picture frame data 102-4, from display position S7 of the vehicle in the picture frame data 102-4 to display position S8 of the vehicle in the picture frame data 102-5, and from display position S9 of the vehicle in the picture frame data 102-5 to display position S10 of the vehicle in the picture frame data 102-6 is shown on the screen. Consequently, the movement of the vehicle in the moving picture becomes discontinuous.

As described above, systems in which data is transmitted or stored using a plurality of layers in order to display a moving picture at an appropriate frame rate depending on the maximum frame rate displayable with a display device on the receiving end are already known. However, in such conventional systems, a picture selected as a picture to be displayed on a low frame rate picture display device is a picture of a decimated picture group (the picture group 102 in FIG. 1) which is obtained by decimating an original high frame rate moving picture (the picture group 101 in FIG. 1). Consequently, there is a problem in that the movement of the displayed moving picture becomes discontinuous.

The present invention is made in view of such problems. The present invention provides a picture processing apparatus, a picture processing method, a picture data storage medium and a computer program, which make it possible to prevent occurrences of discontinuous movements in a displayed moving picture even when the maximum frame rate at which a display device on the receiving end can display a moving picture is low and a moving picture is displayed at that frame rate.

The present invention also provides a picture processing apparatus, a picture processing method, a picture data storage medium and a computer program which prevent occurrences of discontinuous movements in a displayed moving picture by transmitting or storing picture data and executing a process in which these data are used, while applying frame rate data in which a plurality of layers are set.

A first aspect of the present invention is a picture processing apparatus for generating picture data to be applied to picture reproduction processing based on different frame rates, the apparatus including:

picture conversion processing means for generating low frame rate picture data by performing composition processing of a plurality of temporally continuous picture data obtained at a high frame rate; and picture selection processing means for performing a process in which picture data from the high frame rate picture data that is restorable using the low frame rate picture data is decimated; wherein data having a plurality of layers are set as picture data to be applied in picture reproduction processing based on differing frame rates, with the low frame rate picture data as lower layer data, and the decimated data of the high frame rate picture data as higher layer data. In addition, "picture" is a concept including both a frame structured picture used in progressive scan systems and the like, and a field structured picture used in interlace scan systems and the like.

Moreover, in an embodiment of the picture processing apparatus of the present invention, the picture conversion processing means generates medium frame rate picture data by means of composition processing of the high frame rate picture data, and generates the low frame rate picture data by means of composition processing of the generated medium frame rate picture data;

the picture selection processing means performs decimation processing of picture data of the medium frame rate picture data that is restorable by means of the low frame rate picture data; and data having a plurality of layers are set as picture data to be applied in picture reproduction processing based on differing frame rates, with the low frame rate picture data as lower layer data, the decimated data of the medium frame rate picture data as medium layer data, and the decimated data of the high frame rate picture data as higher layer data.

Moreover, in an embodiment of the picture processing apparatus of the present invention, the apparatus further includes compression processing means for executing compression processing of the data having the plurality of layers.

Moreover, in an embodiment of the picture processing apparatus of the present invention, the picture conversion processing means executes a process of generating low frame rate picture data {Bx} based on a plurality of temporally continuous picture data {$A_x$ through $A_{x+n}$} obtained at a high frame rate in accordance with the following formula:

$$B_x=(A_x+A_{x+1}+\ldots+A_{x+n})/n.$$

Moreover, a second aspect of the present invention is a picture processing apparatus for generating picture data according to a processable frame rate of a display device based on picture data of a plurality of layers, the picture processing apparatus comprising:

picture data restoration processing means for restoring high frame rate picture data based on low frame rate picture data included in lower layer data and decimated high frame rate picture data included in higher layer data; and selection output means for selecting and outputting the decimated high frame rate picture data included in the higher layer data, and the high frame rate picture data that was decimated and which was restored by the picture data restoration processing means.

Moreover, in an embodiment of the picture processing apparatus of the present invention, the picture data restoration processing means executes a process for restoring, based on the low frame rate picture data included in the lower layer data and the decimated medium frame rate picture data included in the medium layer data, the medium frame rate picture data that has been decimated, and for restoring, based on the restored medium frame rate picture data and the decimated high frame rate picture data included in the higher layer data, the high frame rate picture data that has been decimated.

Moreover, in an embodiment of the picture processing apparatus of the present invention, the picture processing apparatus further includes decompression processing means for executing decompression processing of the data of the plurality of layers.

Moreover, a third aspect of the present invention is a picture data storage medium storing picture data for application in picture reproduction processing based on differing frame rates, wherein:

low frame rate picture data generated by composition processing of a plurality of temporally continuous picture data obtained at a high frame rate is set as lower layer data, data in which picture data that is restorable using the low frame rate picture data is decimated from the high frame rate picture data is set as higher layer data, and the storage medium stores the data having a plurality of layers as picture data for application in the picture reproduction processing based on the differing frame rates.

Moreover, in an embodiment of the picture data storage medium of the present invention, the storage medium stores the data having the plurality of layers as compressed data.

Further, a fourth aspect of the present invention provides a picture processing method for generating picture data for application in picture reproduction processing based on differing frame rates, the picture processing method including:

a picture conversion processing step of generating low frame rate picture data by composition processing a plurality of temporally continuous picture data obtained at a high frame rate; and a picture selection processing step of performing a process in which picture data that is restorable using the low frame rate picture data is decimated from the high frame rate picture data; wherein data having a plurality of layers are set as picture data to be applied in picture reproduction processing based on differing frame rates, with the low frame rate picture data as lower layer data, and the decimated data of the high frame rate picture data as higher layer data.

Further, in an embodiment of the picture processing method of the present invention, the picture conversion processing step includes a step of generating medium frame rate picture data by composition processing the high frame rate picture data, and for generating low frame rate picture data by composition processing the generated medium frame rate picture data, the picture selection processing step includes a step of performing a process in which picture data that is restorable using the low frame rate picture data is decimated from the medium frame rate picture data, wherein the data having the plurality of layers are generated as picture data for application in the picture reproduction processing based on the differing frame rates, with the low frame rate picture data as lower layer data, the decimated data of the medium frame rate picture data as medium layer data, and the decimated data of the high frame rate picture data as higher layer data.

Further, in an embodiment of the picture processing method of the present invention, the picture processing method further includes a compression processing step of performing compression processing of the data having the plurality of layers.

Moreover, in an embodiment of the picture processing method of the present invention, the picture conversion processing step executes a process of generating low frame rate picture data {Bx} based on a plurality of temporally continuous picture data {$A_x$ through $A_{x+n}$} obtained at a high frame rate in accordance with the following formula:

$$B_x=(A_{x+Ax+1}+\ldots+A_{x+n})/n.$$

Moreover, a fifth aspect of the present invention provides a picture processing method for generating picture data according to a processable frame rate of a display device based on picture data of a plurality of layers, the picture processing method including:

a picture data restoration processing step of restoring, based on low frame rate picture data included in lower layer data and decimated high frame rate picture data included in higher layer data, high frame rate picture data that was decimated; and a selection output step of selecting and outputting the decimated high frame rate picture data included in the higher layer data, and the high frame rate picture data that was decimated and then restored in the picture data restoration processing step.

Further, in an embodiment of the picture processing method according to the present invention, the frame data restoration processing step includes a step of executing a process in which, based on the low frame rate picture data included in the lower layer data and the decimated medium frame rate picture data included in the medium layer data, medium frame rate picture data that was decimated is restored, while, based on the restored medium frame rate picture data and the decimated high frame rate picture data included the higher layer data, high frame rate picture data that was decimated is restored.

Further, in an embodiment of the picture processing method of the present invention, the picture processing method further includes a decompression processing step of executing decompression processing of the data of the plurality of layers.

Further, a sixth aspect of the present invention provides a computer program for executing picture processing for generating picture data for application in picture reproduction processing based on differing frame rates, the computer program including:

a picture conversion processing step of generating low frame rate picture data by composition processing a plurality of temporally continuous picture data obtained at a high frame rate; and a picture selection processing step of performing a process in which picture data that is restorable using the low frame rate picture data is decimated from high frame rate picture data; and a step of setting data having a plurality of layers as picture data to be applied in picture reproduction processing based on differing frame rates, with the low frame rate picture data as lower layer data, and the decimated data of the high frame rate picture data as higher layer data.

Further, a seventh aspect of the present invention provides a computer program for executing picture processing for generating picture data according to a processable frame rate of a display device based on picture data of a plurality of layers, the computer program including:

a picture data restoration processing step of restoring, based on low frame rate picture data included in lower layer data and decimated high frame rate picture data included in higher layer data, high frame rate picture data that was decimated; and a selection output step of selecting and outputting the decimated high frame rate picture data included in the higher layer data, and the high frame rate picture data that was decimated and then restored in the picture data restoration processing step.

According to embodiments of the present invention, it is possible to provide, as picture data including a plurality of layers, picture data that can be displayed on display apparatuses having differing processing frame rates at their respective optimum frame rates, and it is also possible to reproduce pictures at different frame rates on the basis of the data of the plurality of layers. Moreover, since the configuration of the present invention is such that low frame rate picture data is generated based on a plurality of temporally continuous high frame rate pictures, it is possible to generate motion blur that matches the respective reproduction frame rates. Consequently, it is possible to reproduce and display pictures which are adapted to reproduction frame rates that allow for smooth movements of the moving picture.

Moreover, according to embodiments of the present invention, of picture data that include a plurality of layers, since it is possible to set the data in a layer of a higher frame rate picture group as decimated picture data, it is possible to reduce the quantity of data to be transmitted or to be stored.

In addition, the computer program of the present invention is one which can be provided to general purpose computer systems which are capable of executing various program codes in the form of, for example, a storage medium readable by a computer or over a communications medium, examples of which include storage media such as a compact disc, a flexible disk, a magneto optical disc and the like, or communications media such as a network. By providing such a program in a computer readable format, processes in accordance with the program can be run on computer systems.

Further aspects, features and advantages of the present invention will become clear through a more detailed description based on embodiments of the present invention described later as well as the attached drawings. In addition, a "system" in the present specification refers to a logically aggregated configuration of a plurality of devices, and is not limited to one in which each device of the configuration exists within the same housing.

Additional features and advantages are described herein, and will be apparent from the following Detailed Description and the figures.

BRIEF DESCRIPTION OF THE FIGURES

FIG. 25 is a diagram illustrating a display example of picture data having a medium frame rate (60 frames/sec) which is generated by applying a process according to an embodiment of the present invention;

FIG. 29 is a diagram illustrating a display example of picture data having a medium frame rate (60 frames/sec) which is generated by applying a process according to an embodiment of the present invention;

FIG. 31 is a diagram illustrating a display example of picture data having a low frame rate (30 frames/sec) which is generated by applying a process according to an embodiment of the present invention;

FIGS. 32A and 32B are diagrams illustrating application examples of the present invention in transmitting picture data supporting various frame rates.

DETAILED DESCRIPTION

Figure 1:
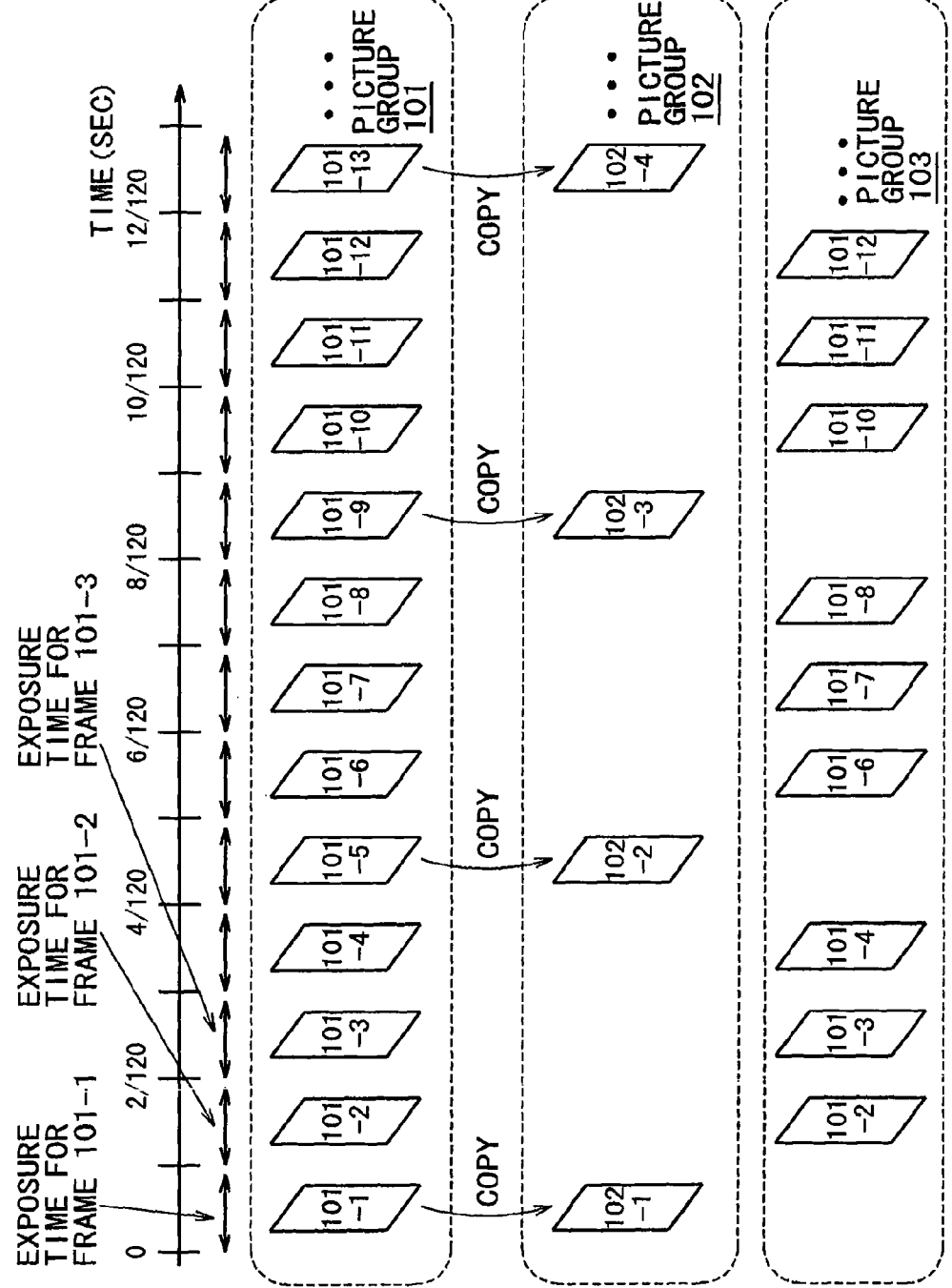
FIG. 1 is a diagram illustrating the configuration of data to be transmitted and received which makes it possible to display picture data of differing frame rates.
Figure 2:
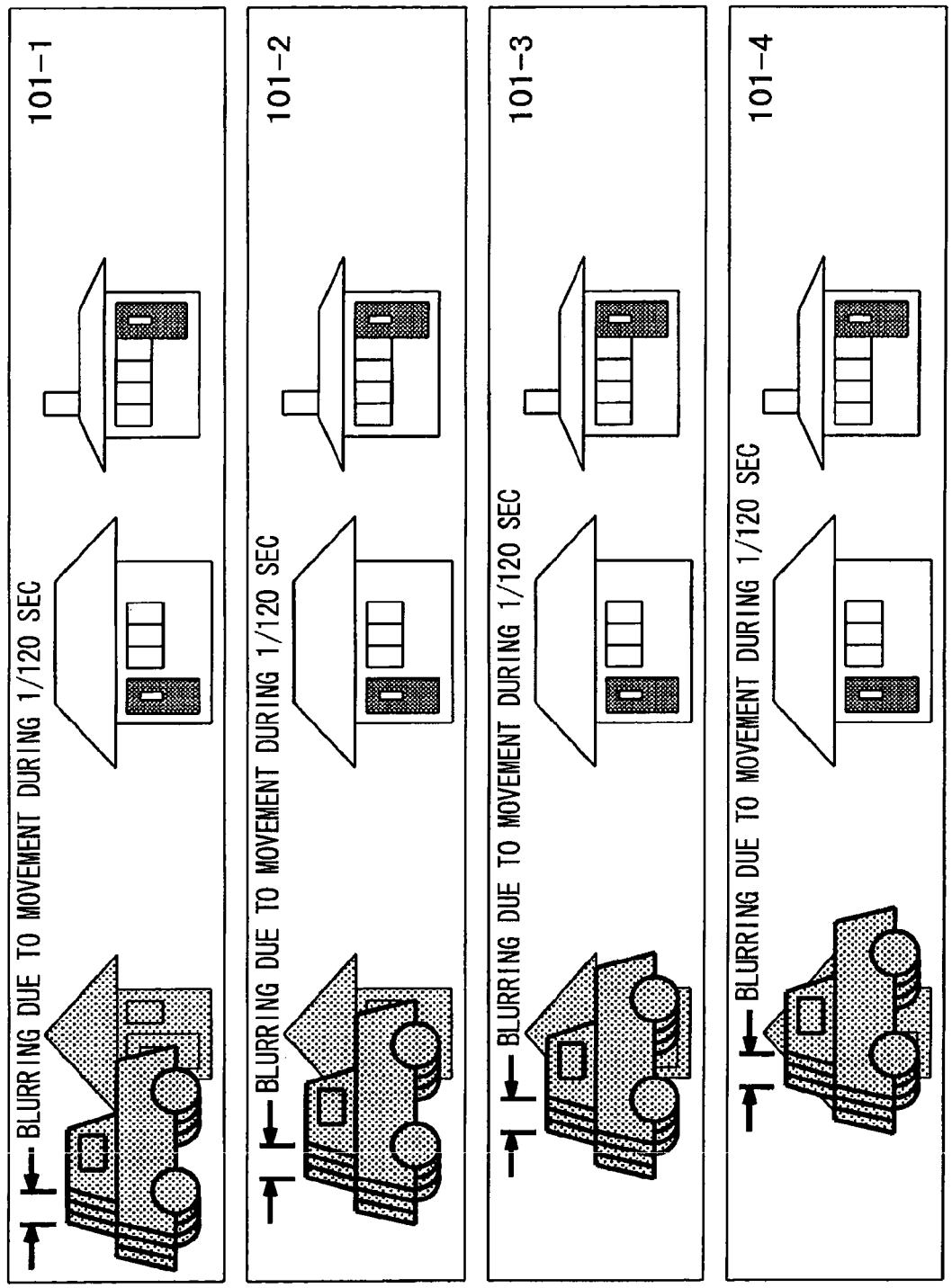
FIG. 2 is a diagram illustrating display examples of picture data having a high frame rate (120 frames/sec)
Figure 3:
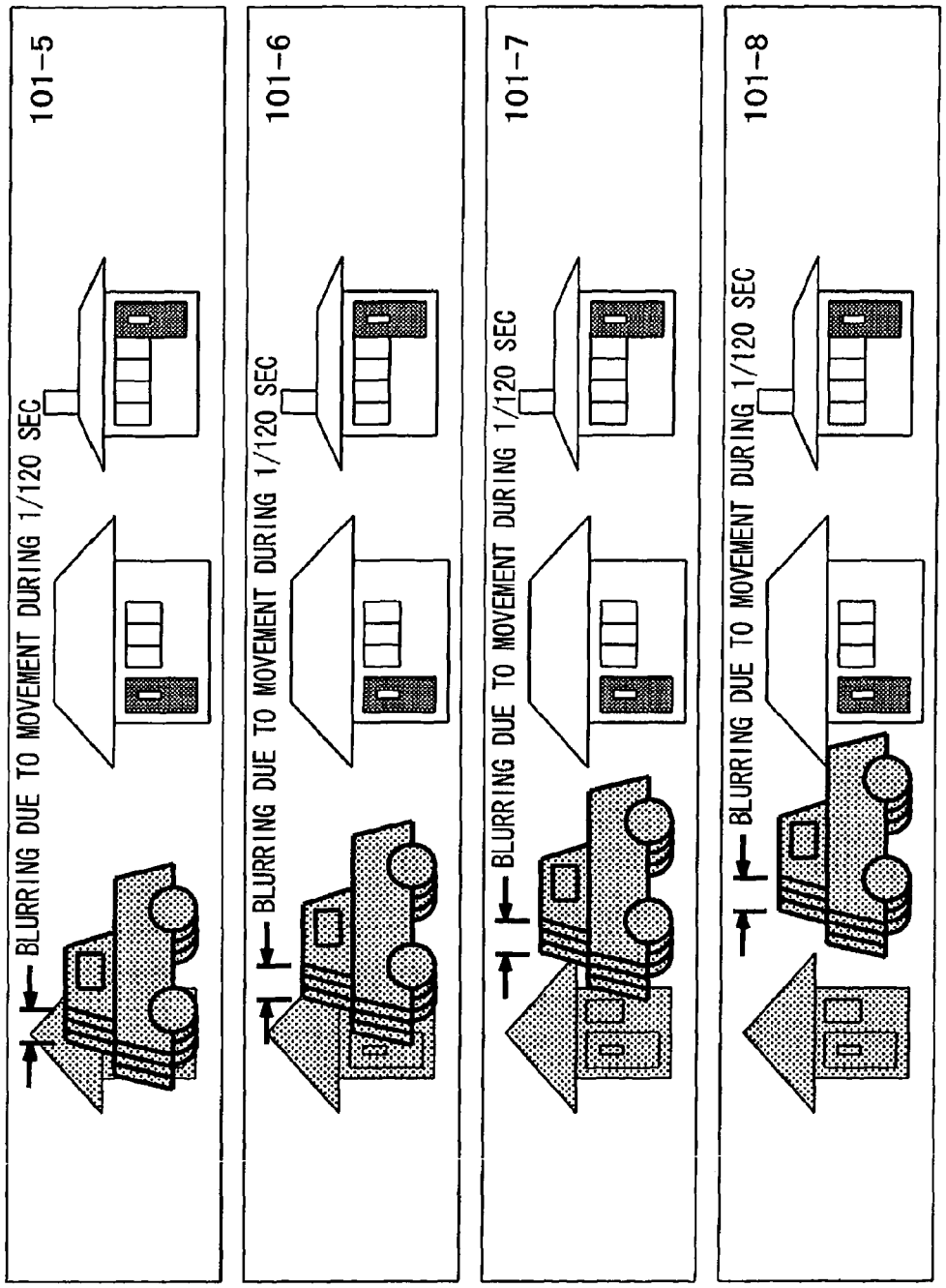
FIG. 3 is a diagram illustrating display examples of picture data having a high frame rate (120 frames/sec)
Figure 4:
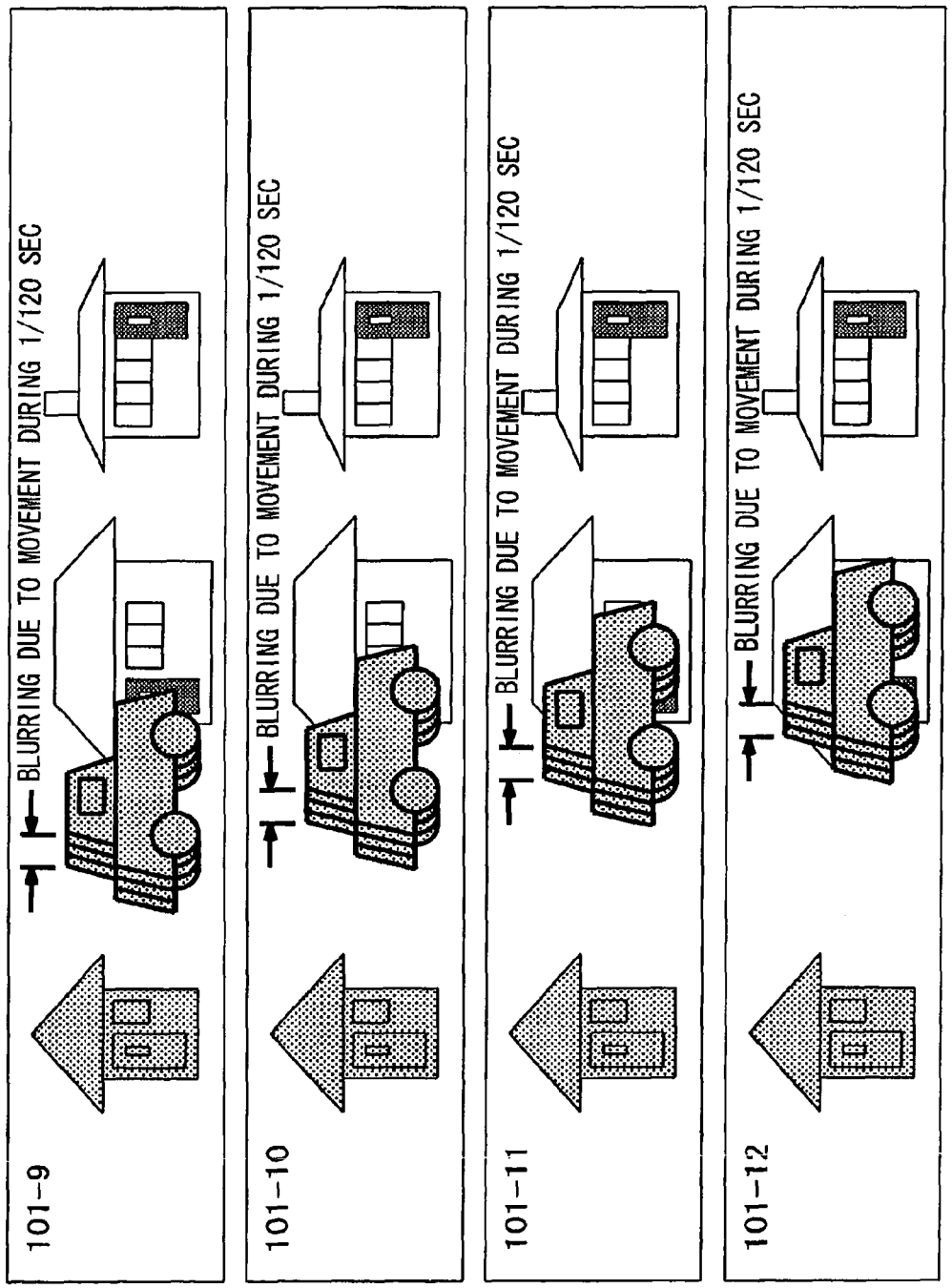
FIG. 4 is a diagram illustrating display examples of picture data having a high frame rate (120 frames/sec)
Figure 5:
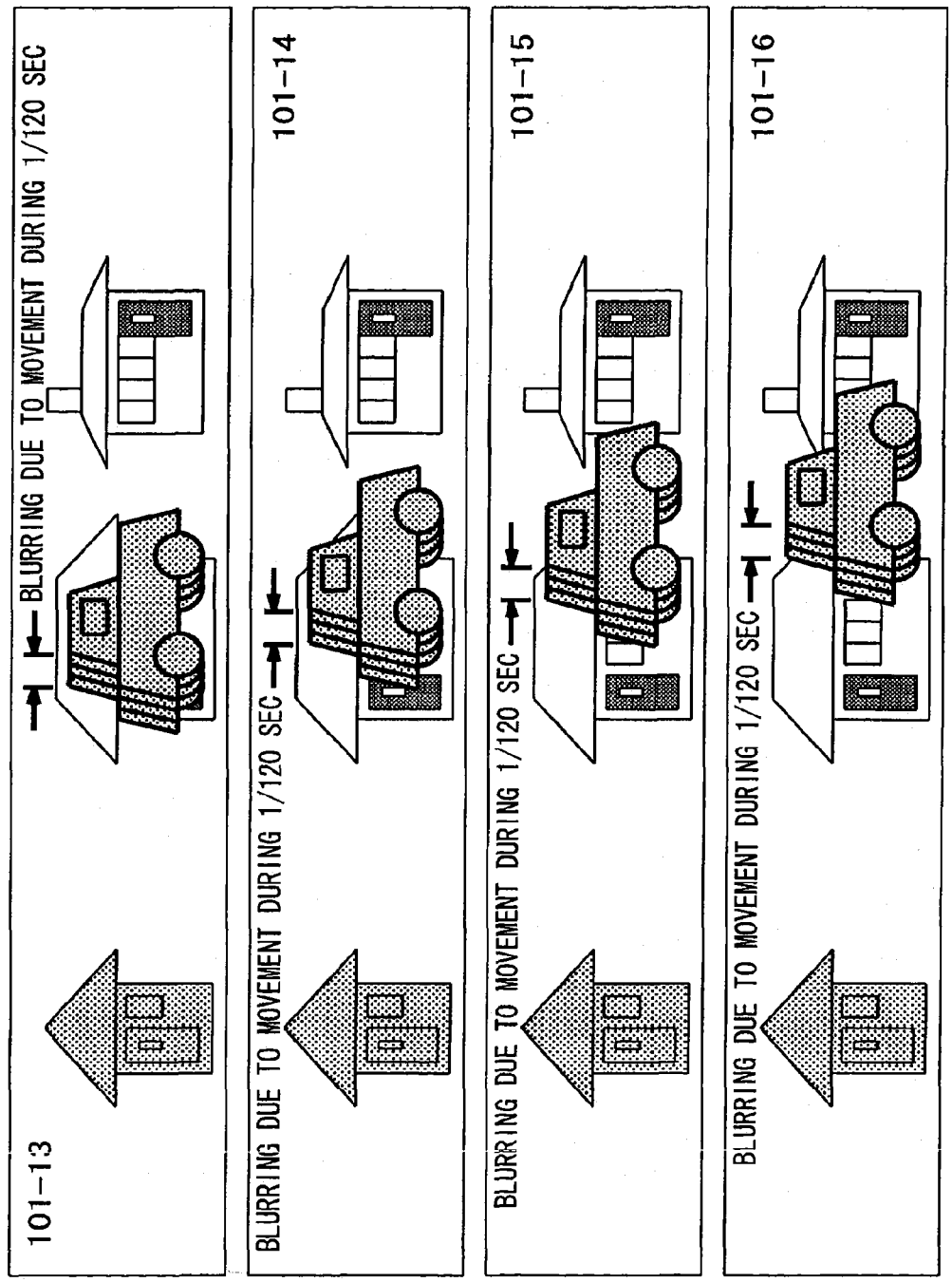
FIG. 5 is a diagram illustrating display examples of picture data having a high frame rate (120 frames/sec)
Figure 6:
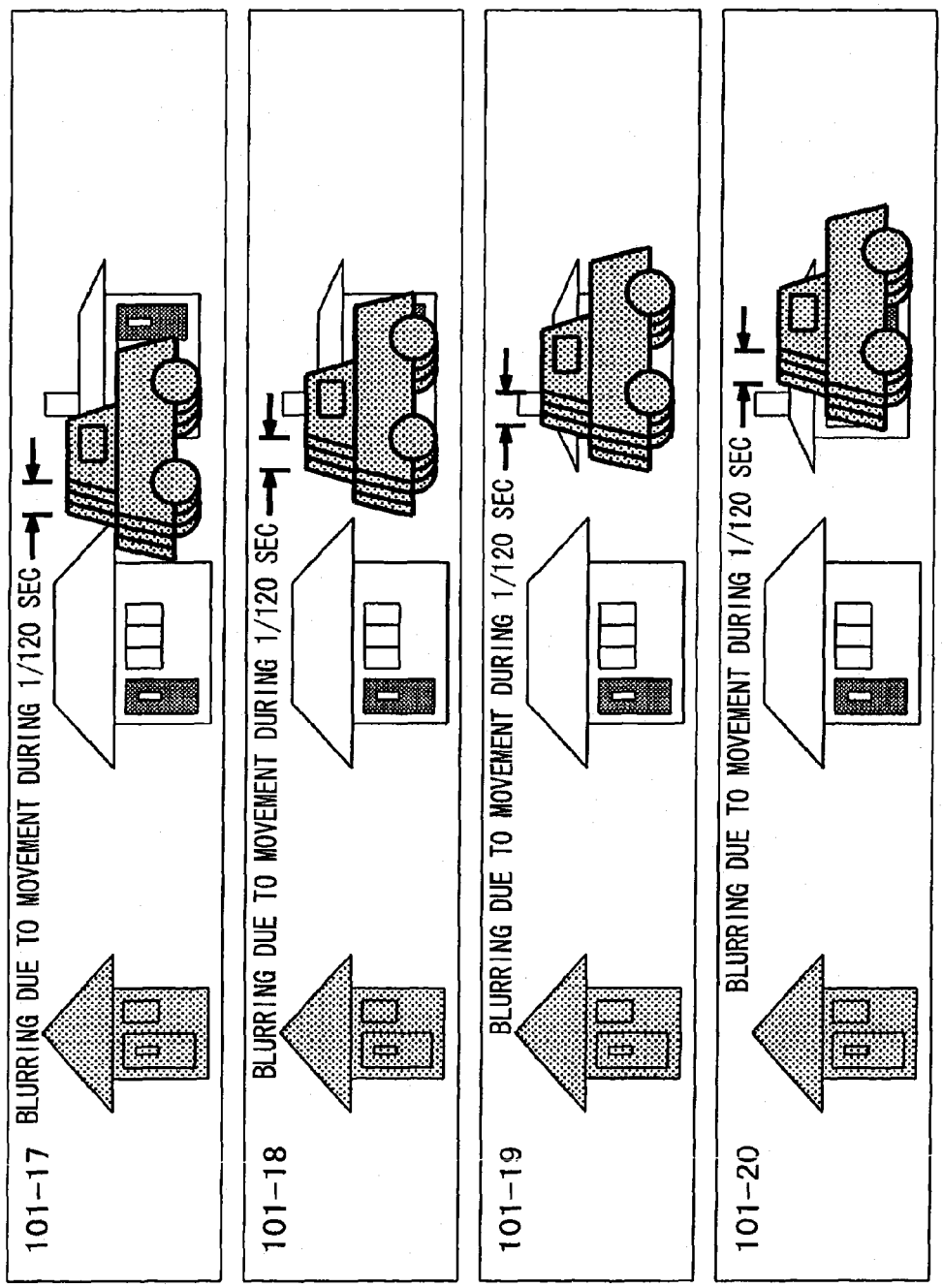
FIG. 6 is a diagram illustrating display examples of picture data having a high frame rate (120 frames/sec)
Figure 7:
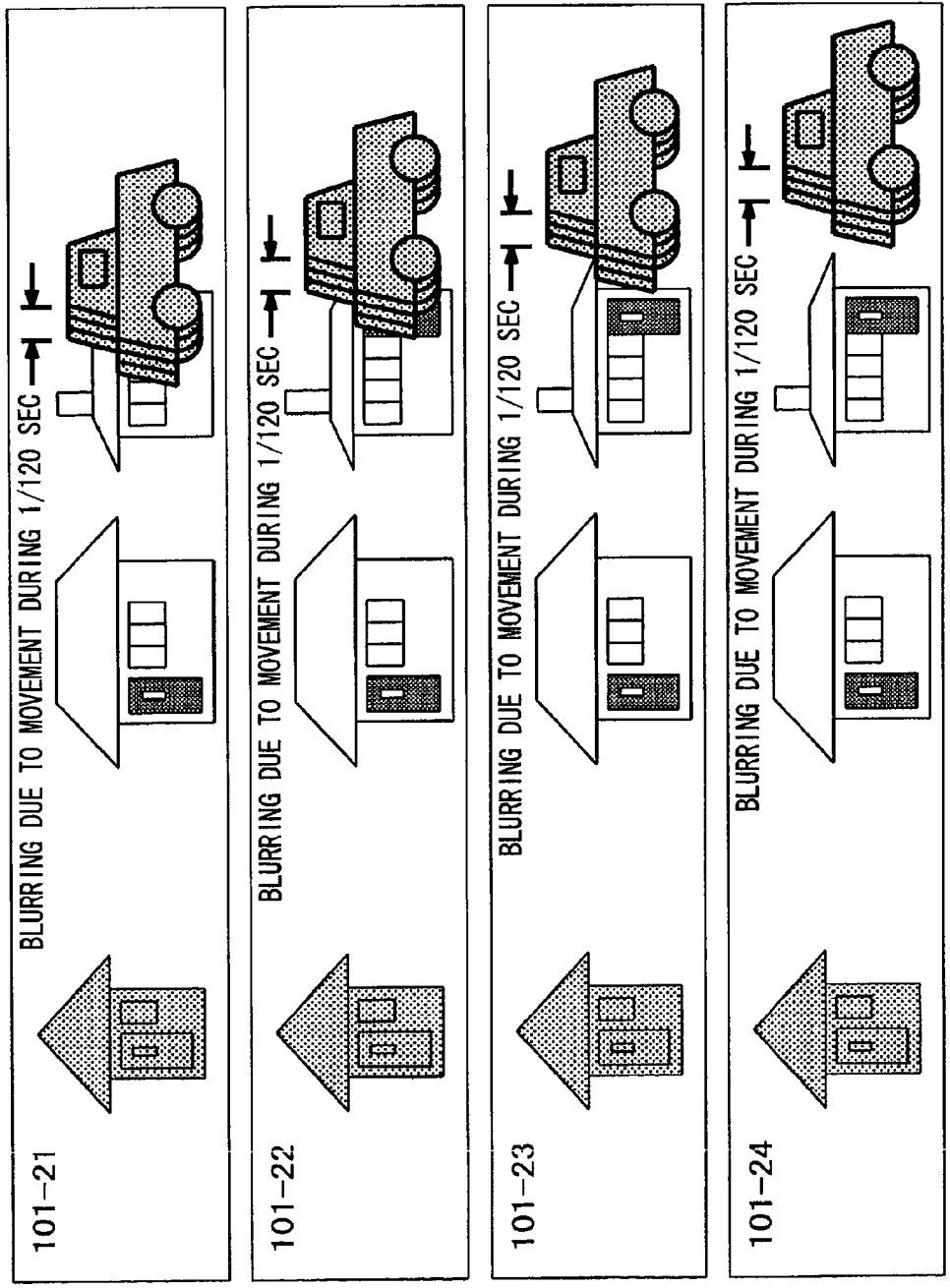
FIG. 7 is a diagram illustrating display examples of picture data having a high frame rate (120 frames/sec)
Figure 8:
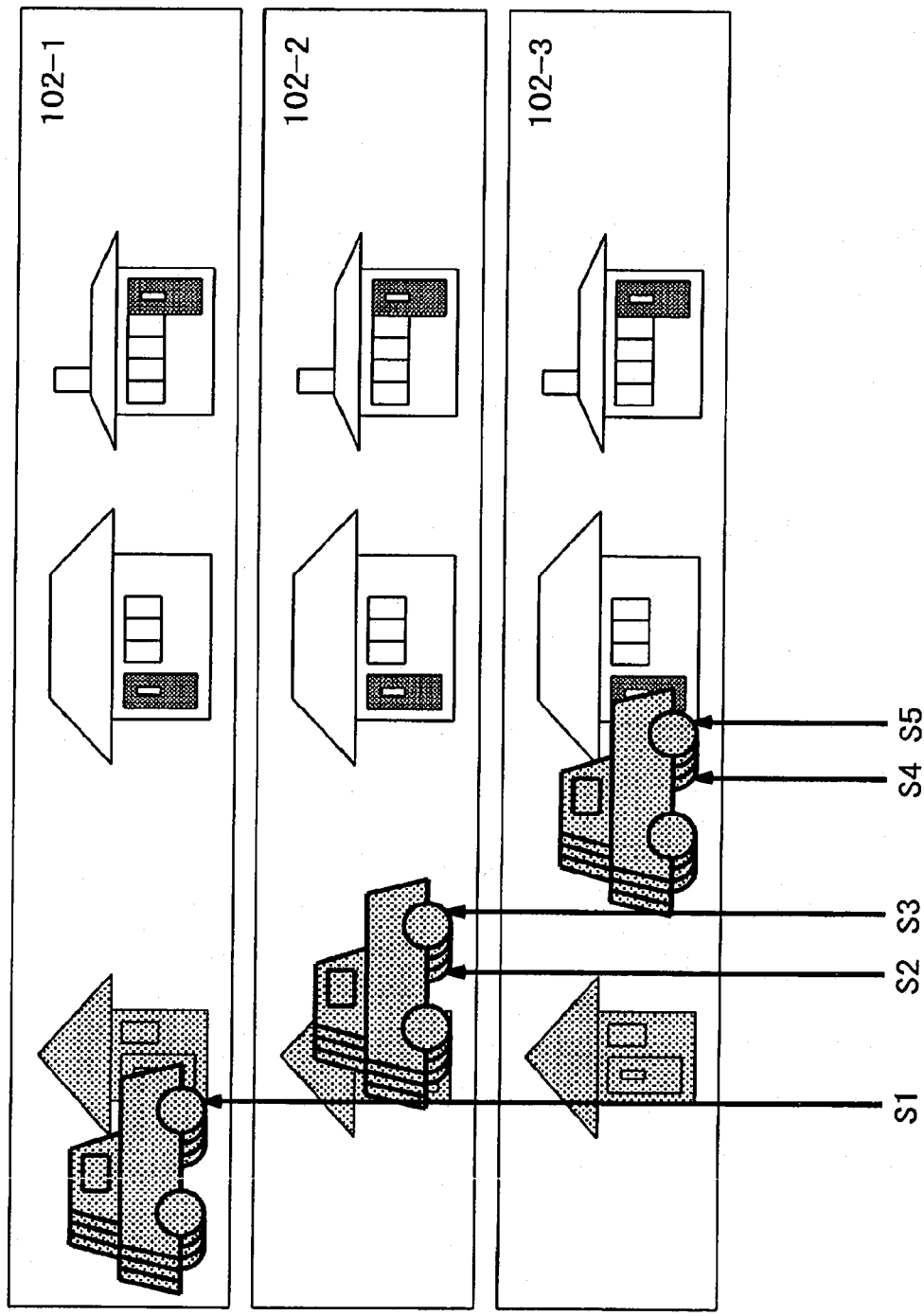
FIG. 8 is a diagram illustrating display examples of picture data having a low frame rate (30 frames/sec)
Figure 9:
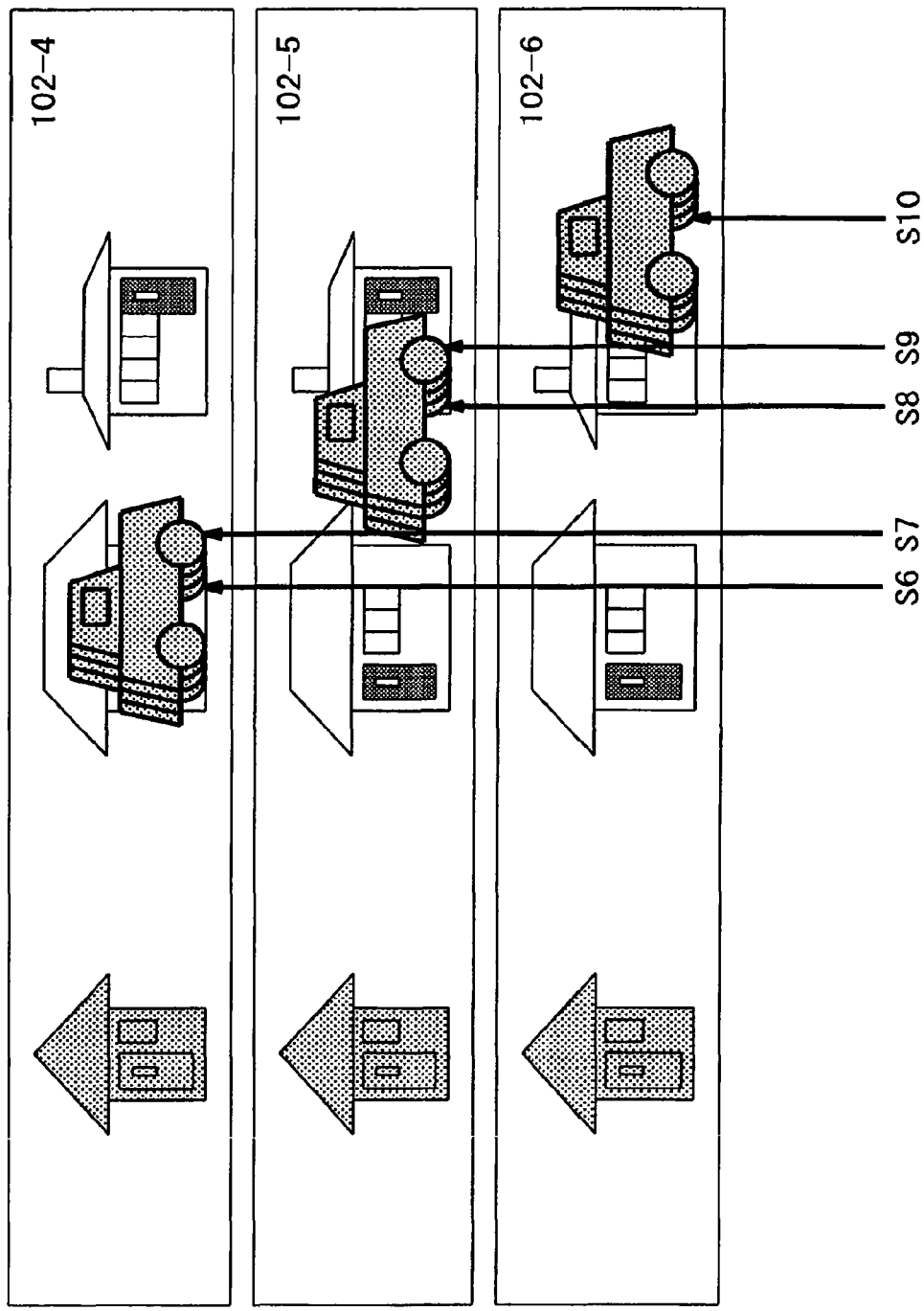
FIG. 9 is a diagram illustrating display examples of picture data having a low frame rate (30 frames/sec)

First, an outline of an embodiment of the present invention will be described. In an embodiment of the present invention, of pictures for transmission from a picture data transmitting end, pictures in which there is motion blur (blurring due to the movement of a subject) are transmitted in a layer (a first layer) for transmitting a low frame rate moving picture.

A display apparatus for performing low frame rate display processing restores moving picture data based solely on the data transmitted in the first layer, and can display a moving picture including pictures in which there is motion blur. Consequently, even when the maximum frame rate at which a display device on the receiving end is capable of displaying a moving picture is limited, for example, when the display device is capable of displaying only low frame rate picture data, it is possible to display a smooth moving picture. Details of embodiments of the present invention will be described below.

In the description of the conventional example above, a case in which two layers are used for the transmission data of a moving picture is described. In order to illustrate how it is also possible to use three or more layers, configuration examples in which data is transmitted in three layers will be described below. The present invention can be applied to the transmission and reception of data having two or more layers.

As display processing modes for displaying picture data on a display processing apparatus in the present embodiment, three kinds of frame rates are used as examples. They are:

(1) a low frame rate of 30 frames/sec,
(2) a medium frame rate of 60 frames/sec, and
(3) a high frame rate of 120 frames/sec.

When a receiving end displays picture data using a display device that can display a moving picture only at the low frame rate of 30 frames/sec, the receiving end smoothly displays the moving picture at 30 frames/sec using only the data in a first layer (a lower layer). When a receiving end displays picture data using a display device which can display a moving picture only at the medium frame rate of 60 frames/sec, the receiving end smoothly displays the moving picture at 60 frames/sec using only the data in the first layer (the lower layer) and a second layer (a medium layer). When a receiving end displays picture data using a display device which can display a moving picture at the high frame rate of 120 frames/sec, the receiving end smoothly displays the moving picture at 120 frames/sec using the data in the first layer (the lower layer), the second layer (the medium layer), and a third layer (an higher layer). Apparatuses and methods for thus realizing the generation, the transmission and reception, and the display processing of display pictures adapted to various frame rates will be described below.

First, the generation processing and the transmission processing of moving picture data will be described. Original pictures of the moving picture data are obtained by taking a moving picture at a frame rate of 120 frames/sec with a camera capable of high speed photographing. Each picture is taken with an exposure time of $1/120$ seconds. These are taken to be the original moving picture.

Next, a moving picture which has a frame rate of 60 frames/sec and which is identical to a moving picture composed of pictures taken with an exposure time of $1/60$ seconds is generated from this original moving picture. Moreover, a moving picture which has a frame rate of 30 frames/sec and which is identical to a moving picture composed of pictures taken with an exposure time of $1/30$ seconds is generated.

By the process described above, a first, a second and a third layer data are transmitted. The first layer data includes the moving picture data having a frame rate of 30 frames/sec and in which each picture is identical to a picture taken with an exposure time of $1/30$ seconds. The second layer data includes the moving picture data having a frame rate of 60 frames/sec and in which each picture is identical to a picture taken with an exposure time of $1/60$ seconds. The third layer data includes the moving picture data having a frame rate of 120 frames/sec and in which each picture is identical to a picture taken with an exposure time of 1/120 seconds.

Figure 10:
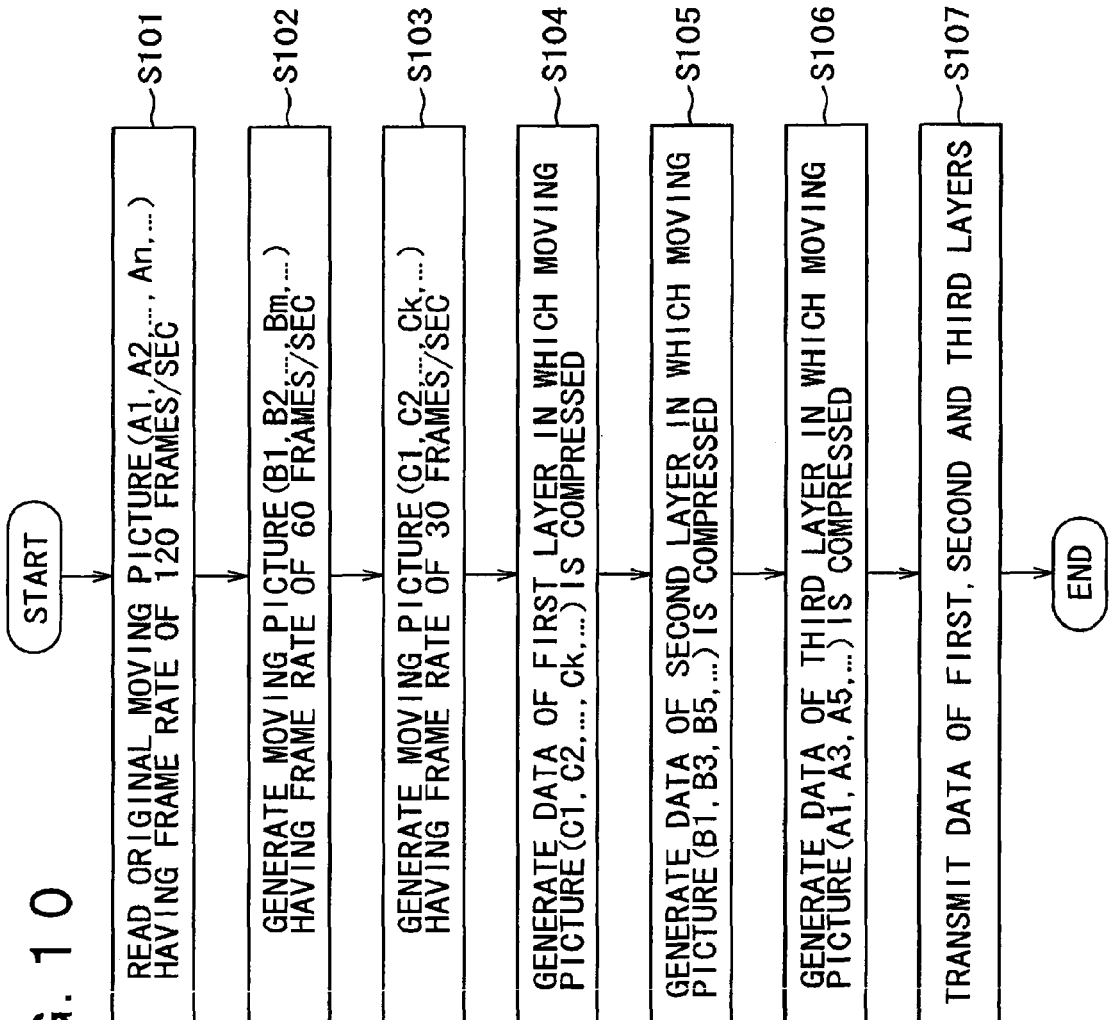
FIG. 10 is a flowchart illustrating a procedure for generating transmission data having a plurality of layers.

FIG. 10 is a flowchart illustrating a procedure for generating transmission data having the above-mentioned three layers, namely the first layer, the second layer and the third layer. First, in step S101 in FIG. 10, an original high frame rate (120 frames/sec) moving picture is inputted. Here, each picture constituting the original moving picture is designated A1, A2, ..., An, ..., respectively. In other words, A1 is the first picture of the moving picture, and is a picture generated by exposure during the first 1/120 seconds. A2 is the second picture, which is generated by exposure during the period between the 1/120th second and the 2/120th second. The same goes to picture A3 and the pictures subsequent thereto.

Then, in step S102, a moving picture, which is identical to one which has a frame rate of 60 frames/sec and which includes pictures taken with an exposure time of 1/60 seconds, is generated. Each picture of the moving picture is designated B1, B2, ..., Bm, ....

A method of generating the moving picture that is identical to one which is taken with an exposure time of 1/60 seconds is now described below. An average value of picture frame data A1 and picture frame data A2 of the original 120 frames/sec high frame rate moving picture is calculated as [(A1+A2)/2], and the calculated average value is taken to be picture frame data B1 of the 60 frames/sec medium frame rate moving picture. More specifically, the sum of the pixel value of each pixel in picture frame data A1 of the high frame rate moving picture and the pixel value of the corresponding pixel in picture frame data A2 is divided by 2, and this value is set as the pixel value of the corresponding pixel in picture frame data B1 of the 60 frames/sec medium frame rate moving picture, and picture frame data B1 is thus generated.

Picture frame data A1 is the data of a picture generated by exposure during the first 1/120 seconds, and picture frame data A2 is the data of a picture generated by exposure during the period between the 1/120th second and the 2/120th second. Therefore, the data generated by adding the data of these two pictures is equivalent to the data of a picture generated by exposure during the first 2/120 seconds. Dividing (A1+A2) by 2 is performed so that the brightness is not changed. Through this process, it is possible to generate picture frame data B1 as data of a picture that is the same as one that is produced by exposure during the first 1/60 seconds, that is, a picture taken with an exposure time of 1/60 seconds.

Similarly, an average value of picture frame data A3 and picture frame data A4 of the original 120 frames/sec high frame rate moving picture is calculated as [(A3+A4)/2], and the calculated average value is taken to be picture frame data B2 of the 60 frames/sec medium frame rate moving picture. Picture frame data A3 is the data of a picture generated by exposure during the period between the 2/120th second and the 3/120th second, and picture frame data A4 is the data of a picture generated by exposure during the period between the 3/120th second and the 4/120th second. Therefore, the data generated by adding the data of these two pictures is equivalent to the data of a picture generated by exposure during a period of 1/60 seconds between the 2/120th second and the 4/120th second. Dividing (A3+A4) by 2 is performed so that the brightness is not changed.

Thereafter, in a similar fashion, an average value of picture frame data $A_{2m-1}$ and picture frame data $A_{2m}$ of the original 120 frames/sec high frame rate moving picture is calculated as $[(A_{2m-1}+A_{2m})/2]$, and the calculated average value is taken to be picture frame data Bm of the 60 frames/sec medium frame rate moving picture.

Thus, the moving picture (B1, B2, ..., $B_m$, ...) which has the frame rate of 60 frames/sec and in which each picture is the same as one that is taken with an exposure time of 1/60 sec is generated. B1 is the first picture of the moving picture, and is one that is generated by exposure during a period between the first 1/60 seconds. B2 is the second picture of the moving picture, and is one that is generated by exposure during the period between the 1/60th second and the 2/60th second. The same goes to B3 and the subsequent pictures.

Then, in step S103, a moving picture that has a frame rate of 30 frames/sec and in which each picture is the same as one that is taken with an exposure time of 1/30 seconds is generated. Each picture of the moving picture is designated C1, C2, ..., Ck, ....

Specifically, an average value of picture frame data B1 and picture frame data B2 of the 60 frames/sec medium frame rate moving picture is calculated as [(B1+B2)/2], and the calculated average value is taken to be picture frame data C1 of the 30 frames/sec low frame rate moving picture. More specifically, the sum of the pixel value of each pixel in picture frame data B1 of the medium frame rate moving picture and the pixel value of the corresponding pixel in picture frame data B2 is divided by 2, and this value is set as the pixel value of the corresponding pixel in picture frame data C1 of the 30 frames/sec low frame rate moving picture, and picture frame data C1 is thus generated.

Picture frame data B1 is equivalent to the data of a picture generated by exposure during the first 1/60 seconds, and picture frame data B2 is equivalent to the data of a picture generated by exposure during a period between the 1/60th second and the 2/60th second. Therefore, the data generated by adding the data of these two pictures is equivalent to the data of a picture generated by exposure during the 1/30 seconds between the 0th second and the 2/60th second. Dividing (B1+B2) by 2 is performed so that the brightness is not changed.

Similarly, an average value of picture frame data B3 and picture frame data B4 of the 60 frames/sec medium frame rate moving picture is calculated as [(B3+B4)/2], and the calculated average value is taken to be picture frame data C2 of the 30 frames/sec low frame rate moving picture. Picture frame data B3 is the data of a picture generated by exposure during the period between the 2/60th second and the 3/60th second, and picture frame data B4 is the data of a picture generated by exposure during the period between the 3/60th second and the 4/60th second. Therefore, the data generated by adding the data of these two pictures is equivalent to the data of a picture generated by exposure during a period of 1/30 seconds between the 2/60th second and the 4/60th second. Dividing (B3+B4) by 2 is performed so that the brightness is not changed.

Thereafter, in a similar fashion, an average value of picture frame data $B_{2k-1}$ and picture frame data $B_{2k}$ of the 60 frames/sec medium frame rate moving picture is calculated as $[(B_{2k-1}+B_{2k})/2]$, and the calculated average value is taken to be picture frame data Ck of the 30 frames/sec low frame rate moving picture.

Thus, the moving picture (C1, C2, ..., Ck, ...) which has the frame rate of 30 frames/sec and in which each picture is the same as one that is taken with an exposure time of 1/30 seconds is generated. C1 is the first picture of the moving picture, and is one that is generated by exposure during a period between the first 1/30 seconds. B2 is the second picture of the moving picture, and is one that is generated by exposure during the period between the 1/30th second and the 2/30th second. The same idea applies to C3 and the subsequent pictures.

Then, in step S104, compressed data of the first layer data, that is, the data of the 30 frames/sec low frame rate moving picture, is generated. In other words, compression of the data of the picture group {C1, C2, ..., Ck, ...} generated in step S103 is performed. It is possible to apply compression methods such as, for example, motion compensation (MC) or discrete cosine transform (DCT). MC and DCT are methods commonly used in the field of data compression, and detailed descriptions thereof are herein omitted.

Then, in step S105, compressed data of the second layer data, namely the data of the 60 frames/sec medium frame rate moving picture, is generated. In other words, compression of the data of the picture group {B1, B2, ..., Bm, ...} generated in step S102 is performed.

Since the first layer data, too, is always received when the second layer data is used on the receiving end, the first layer data may be used as a reference when compression of the second layer data is performed. In other words, the picture group {C1, C2, ..., Ck, ...} constituting the 30 frames/sec low frame rate moving picture that can be restored from the first layer data may be used as a reference in compressing the second layer data. Since C1=(B1+B2)/2, even when no information concerning picture data B2 of the 60 frames/sec medium frame rate exists in the second layer data, picture data B2 can be restored with the equation B2=(2×C1)−B1 so long as data concerning data B1 exists.

In other words, picture data B2 does not necessarily have to be transmitted as data of the second layer. Along the same lines, picture data B4, B6, B8, ... do not have to be transmitted as second layer data. Accordingly, of the picture group of the 60 frames/sec medium frame rate, only the picture group including picture data B1, B3, B5, ... need be considered and compressed. Compression may be performed through, for example, MC and DCT. Naturally, for MC, a reference picture is necessary. However, the reference picture need not be a picture in the picture group {B1, B3, B5, ...}, but instead may be a picture in the picture group {C1, C2, ..., Ck, ...}. In introducing scalability, the fact that compression of a picture in a lower layer through MC may be performed using a picture of a higher layer as a reference picture is well known in the art, and therefore a detailed description thereof will herein be omitted.

Then, in step S106, compressed data of the third layer data, that is, the data of the 120 frames/sec high frame rate moving picture, is generated. Specifically, the picture group {A1, A2, ..., An, ...} is compressed. Since the first layer and second layer data, too, are always received when the third layer data is used on the receiving end, the first layer and second layer data may be used as references when compression of the third layer data is performed.

In other words, the picture group {C1, C2, ..., Ck, ...} of the 30 frames/sec low frame rate that can be restored from the first layer data, as well as the picture group {B1, B2, ..., Bm, ...} of the 60 frames/sec medium frame rate that can be restored from the second layer data may be used as references in compressing the third layer data. Since B1=(A1+A2)/2, even when no information concerning picture frame data A2 of the 120 frames/sec high frame rate exists in the third layer data composed of 120 frames/sec high frame rate picture data, picture data A2 can be restored with the equation A2=(2×B1)−A1 so long as data concerning data A1 exists.

In other words, picture data A2 does not necessarily have to be transmitted as data of the third layer. Along the same lines, picture data A4, A6, A8, ... do not have to be transmitted as third layer data. Accordingly, of the picture group of the 120 frames/sec high frame rate, only the picture group including picture data A1, A3, A5, ... need be considered and compressed. Compression may be performed through, for example, MC and DCT. Naturally, for MC, a reference picture is necessary. However, the reference picture need not be a picture in the picture group {A1, A3, A5, ...}, but instead may be a picture in the picture group {C1, C2, ..., Ck, ...} or in the picture group {B1, B2, ..., Bm, ...}.

Then in S107, the first layer data, the second layer data and the third layer data generated in steps S104, S105 and S106, respectively, are transmitted. Alternatively, they may be recorded on a storage medium for distribution.

A configuration example of a picture processing apparatus for executing the process described in FIG. 10 will be described with reference to FIG. 11. The process described with reference to the flowchart of FIG. 10 can be processed by means of a composite configuration of software and hardware, such as a data processing apparatus equipped with control means including a central processing unit (CPU) and a memory section including a random access memory (RAM), a read only memory (ROM) and the like, examples of which include a PC or the like. The configuration of such a data processing apparatus will be described later. Here, the configuration of a processing apparatus for executing the process shown in FIG. 10 will be described with reference to the functional block diagram of FIG. 11 showing functions executed by a CPU of a PC or the like in blocks.

Figure 11:
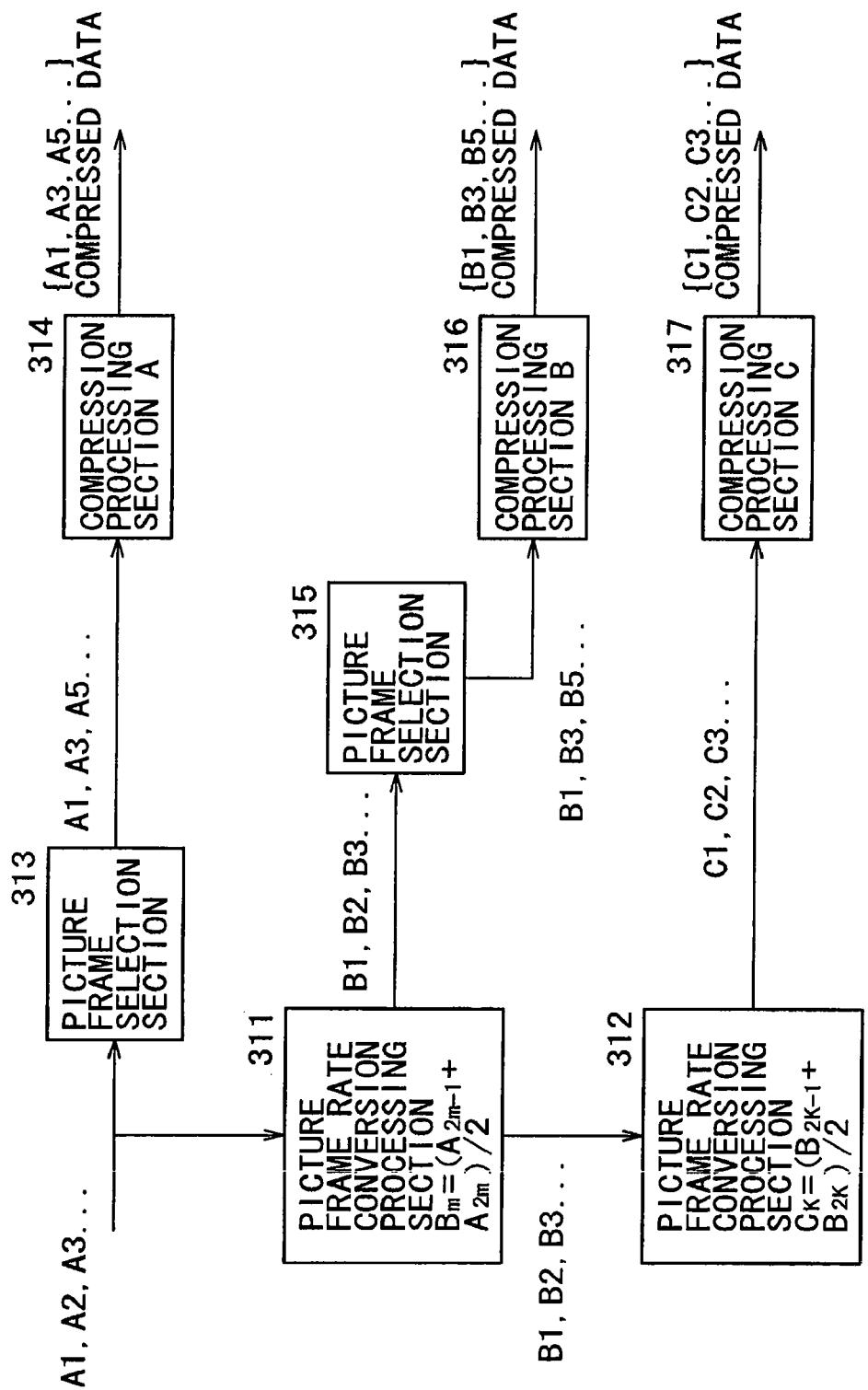
FIG. 11 is a block diagram showing the configuration of a picture processing apparatus for generating transmission data having a plurality of layers.

Picture data that is inputted to the picture processing apparatus is the original high frame rate picture data A1, A2, ..., An, ... having the high frame rate of 120 frames/sec shown in the upper left section of FIG. 11. A picture frame rate conversion processing section 311 receives the high frame rate picture data A1, A2, ..., An, ..., and produces picture data B1, B2, ..., Bm, ... which has a frame rate of 60 frames/sec and in which each picture is the same as one that is taken with an exposure time of 1/60 seconds. Specifically, an average value of the picture frame data $A_{2m-1}$ and the picture frame data $A_{2m}$ of the original 120 frames/sec high frame rate moving picture is calculated with the equation $(A_{2m-1}+A_{2m})/2$, and is taken to be picture frame data Bm of the 60 frames/sec medium frame rate moving picture B1, B2, ..., Bm, ....

A picture frame rate conversion processing section 312 receives the medium frame rate picture data B1, B2, ..., Bm, ..., and produces picture data C1, C2, Ck, ... which has the frame rate of 30 frames/sec and in which each picture is the same as one that is taken with an exposure time of 1/30 seconds. Specifically, an average value of the picture frame data $B_{2k-1}$ and the picture frame data $B_{2k}$ of the inputted 60 frames/sec medium frame rate moving picture is calculated with the equation $(B_{2k-1}+B_{2k})/2$, and is taken to be picture frame data Ck of the 30 frames/sec low frame rate moving picture C1, C2, ..., Ck, ....

A picture frame selection section 313 receives the original high frame rate picture data A1, A2, ..., An, ..., and selects every other picture frame data A1, A3, A5 ... as data constituting the third layer data to be outputted. Then, the frame selection section 313 outputs the selected picture frame data to a compression processing section A 314.

The compression processing section A 314 receives the picture data A1, A3, A5 ... constituting the high frame rate picture data, and generates the third layer data {A1, A3, A5, ...} as compressed data after executing, for example, compression that applies MC and DCT, such as MPEG compression, and outputs it.

Moreover, a picture frame selection section 315 receives the medium frame rate picture data B1, B2, ..., Bm, ... from the picture frame rate conversion processing section 311, and selects every other picture data B1, B3, B5 ... as data constituting the second layer data to be outputted. Then, the frame selection section 315 outputs the selected picture frame data to a compression processing section B 316.

The compression processing section B 316 receives the picture frame data B1, B3, B5 . . . constituting the medium frame rate picture data, and generates the second layer data {B1, B3, B5, . . . } as compressed data after executing, for example, compression that applies MC and DCT, such as MPEG compression, and outputs it.

A compression processing section C 317 receives the low frame rate picture data C1, C2, . . . , Ck, . . . from the frame rate conversion processing section 312, and generates and outputs the first layer data {C1, C2, C3, . . . } as compressed data by executing, for example, MPEG compression much like the other compression processing sections.

The data having a plurality of layers may be distributed through a communications network such as the Internet or the like to users with various picture display devices. Alternatively, the data may be provided to users in the form of storage media storing the data such as a CD, a DVD, a semiconductor memory such as a flash memory and the like.

The data stored in storage media such as CDs, DVDs, semiconductor memories such as flash memories and the like is data of a plurality of layers including medium and low layer data composed of medium and low frame rate picture frame data, respectively, generated by composition processing of a plurality of temporally continuous picture data obtained at a high frame rate, and high and medium layer data composed of data in which, of the high and medium picture frame rate data, respectively, picture frame data that is restorable using the low frame rate picture frame data is decimated.

Next, processes of receiving the data of the plurality of layers mentioned above and of generating picture data to be outputted to a display device based on the received data on the receiving end will be described. First, a process of generating picture data in a case where the receiving end outputs the picture data to a picture display device which can display moving pictures only at a frame rate of 30 frames/sec is described.

Figure 12:
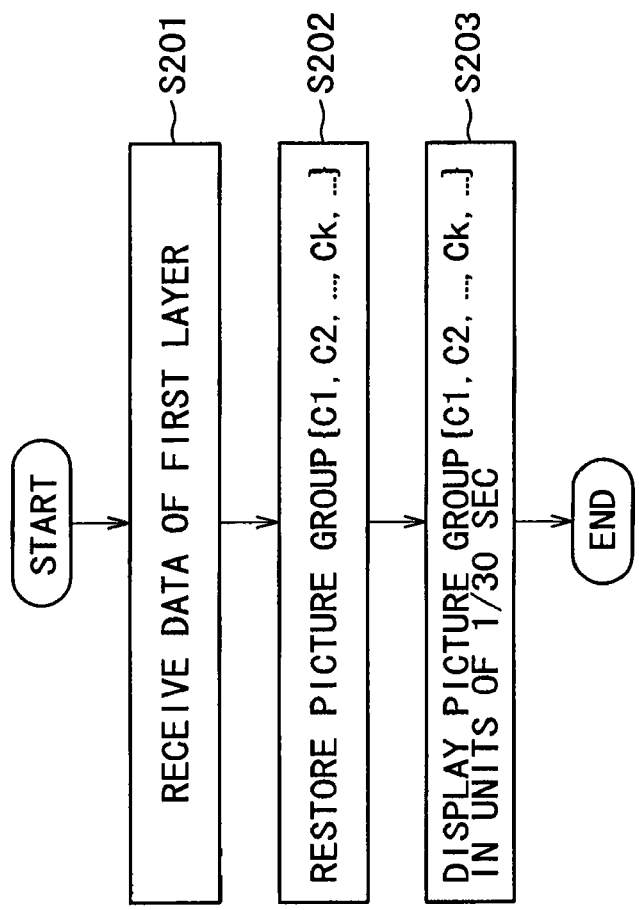
FIG. 12 is a flowchart illustrating a procedure for receiving picture data to generate low frame rate output picture data.

First, in step S201 of FIG. 12, the data receiving end receives the first layer data, that is, the compressed data of the 30 frames/sec low frame rate picture group {C1, C2, . . . , Ck, . . . }. In the case of distribution through a storage medium, the stored data is reproduced, and the first layer data is extracted. Then, in step S202, the picture group {C1, C2, . . . , Ck, . . . } is restored by decompressing the first layer data. Specifically, decompression is executed through a process in which, for example, MC and the inverse discrete cosine transform (IDCT) are applied. Then in step S203, the picture group {C1, C2, . . . , Ck, . . . } restored in step S202 is sequentially displayed from C1 on a display device in durations of the 1/30 seconds.

The moving picture composed of the picture group {C1, C2, . . . , Ck, . . . } has a frame rate of 30 frames/sec, and is equivalent to a moving picture in which each picture is taken with an exposure time of 1/30 seconds. When a moving object is filmed, each picture has a motion blur of 1/30 seconds, and because the moving picture is displayed at the frame rate of 30 frames/sec, the movement of the displayed picture is smooth.

Figure 13:
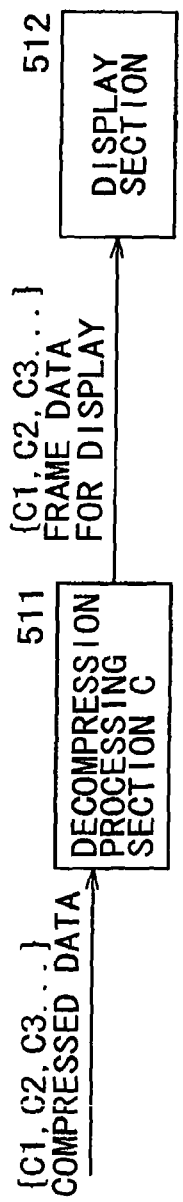
FIG. 13 is a block diagram of the configuration of a picture processing apparatus for executing a process of receiving picture data to generate low frame rate output picture data.

Next, a configuration example of a picture processing apparatus for executing the process shown in FIG. 12 will be described with reference to FIG. 13. The process described with reference to the flowchart of FIG. 12 can be processed by means of a composite configuration of software and hardware, such as a data processing apparatus equipped with control means including a central processing unit (CPU) and a memory section including a random access memory (RAM), a read only memory (ROM) and the like, examples of which include a PC or the like. The configuration of such a data processing apparatus will be described later. Here, the configuration of a processing apparatus for executing the process shown in FIG. 12 will be described with reference to the functional block diagram of FIG. 13 showing functions executed by a CPU of a PC or the like in blocks.

When the receiving end generates picture data to be outputted to a display section 512 as a picture display device which can display moving pictures only at the frame rate of 30 frames/sec, input data is the first layer data, namely the compressed data of the 30 frames/sec low frame rate picture group {C1, C2, . . . , Ck, . . . }. A decompression processing section C 511 decompresses the first layer data to restore the picture group {C1, C2, . . . , Ck, . . . }. Specifically, decompression is executed, for example, as a decompression process in which MC and IDCT are applied.

The picture group {C1, C2, . . . , Ck, . . . } as decompressed data is outputted to the display section 512, and is sequentially displayed from picture C1 on the display device in durations of 1/30 seconds. In other words, display processing at a frame rate of 30 frames/sec in accordance with the frame rate processable by the display device is executed.

Figure 14:
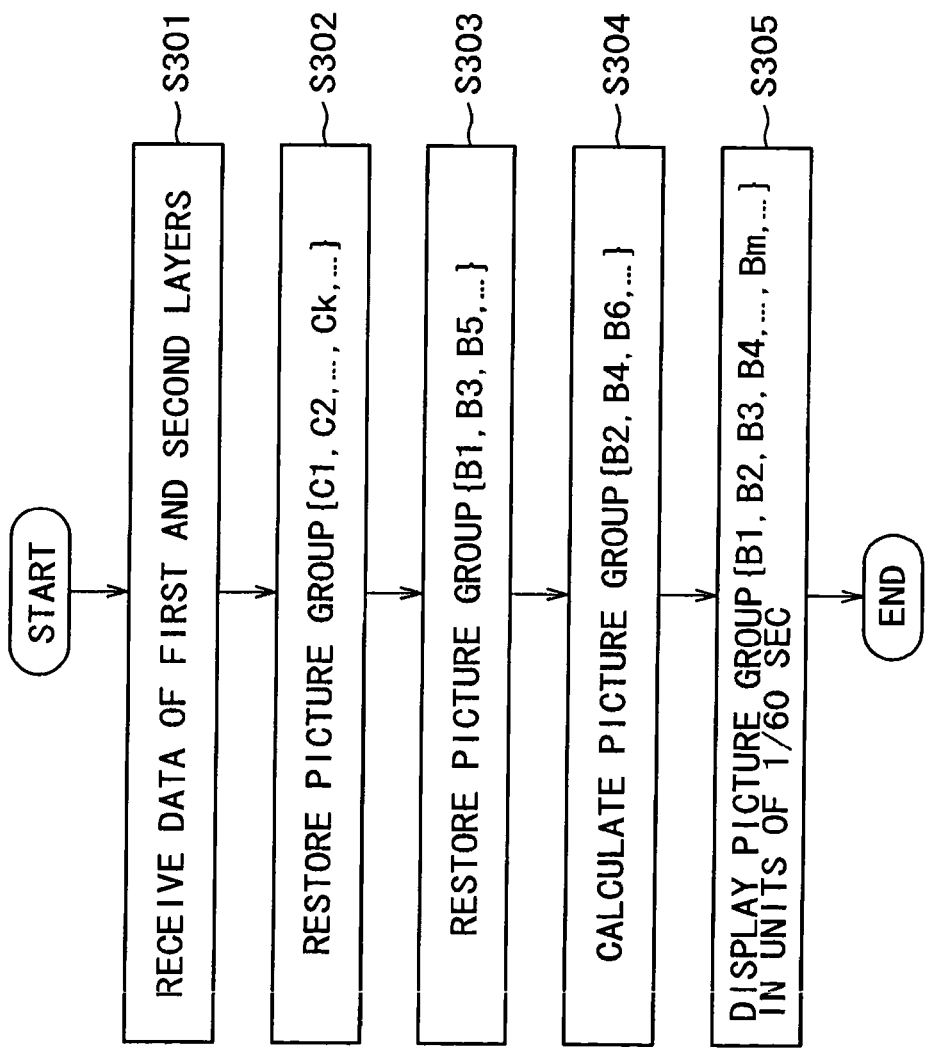
FIG. 14 is a flowchart illustrating a procedure for receiving picture data having a plurality of layers to generate medium frame rate output picture data.

Next, the processing in a case where the receiving end generates picture data to be displayed on a picture display device which can display at the frame rate of 60 frames/sec is described with reference to the flowchart shown in FIG. 14. First, in step S301 of FIG. 14, on the data receiving end, the first layer data and the second layer data, namely the compressed data of the 30 frames/sec low frame rate picture group {C1, C2, . . . , Ck, . . . } and the compressed data of the 60 frames/sec medium frame rate picture group {B1, B3, B5, . . . } are received. In the case of distribution via a storage medium, the data receiving end reads the storage medium and extracts the first layer data and the second layer data.

Then, in step S302, the first layer data is decompressed and the picture group {C1, C2, . . . , Ck, . . . } is restored. Specifically, decompression is executed, for example, by MC and IDCT. Then, in step S303, the second layer data is decompressed and the picture group {B1, B3, B5, . . . } is restored. Specifically, decompression is executed, for example, through MC and IDCT. In so doing, if necessary, the picture data {B1, B3, B5, . . . } is restored using the picture group {C1, C2, . . . , Ck, . . . } restored in step S302.

Then, in step S304, the picture group {B2, B4, B6, . . . }, which is not included in the 60 frames/sec medium frame rate picture group {B1, B3, B5, . . . } received as the second layer data, is calculated. Specifically, the calculation is carried out in a process that applies the 30 frames/sec low frame rate picture group {C1, C2, C3 . . . } restored in step S302 and the 60 frames/sec medium frame rate picture group {B1, B3, B5 . . . } restored in step S303 as follows: B2=(2×C1)−B1, B4=(2×C2)−B3, B6=(2×C3)−B5, and so forth.

When the 60 frames/sec medium frame rate picture group is reproduced as continuous frames in step S304, the process proceeds to step S305. In step S305, the 60 frames/sec medium frame rate picture group {B1, B2, B3, B4, . . . , Bm, . . . } restored in steps S303 and S304 are displayed sequentially from picture B1 on the display device.

The moving picture composed of the picture group {B1, B2, B3, B4, . . . , Bm, . . . } has a frame rate of 60 frames/sec, and each picture is equivalent to a picture taken with an exposure time of 1/60 seconds. When a moving object is filmed, each picture has a motion blur of 1/60 seconds, and because the moving picture is displayed at a frame rate of 60 frames/sec, the movement of the displayed picture is smooth.

Figure 15:
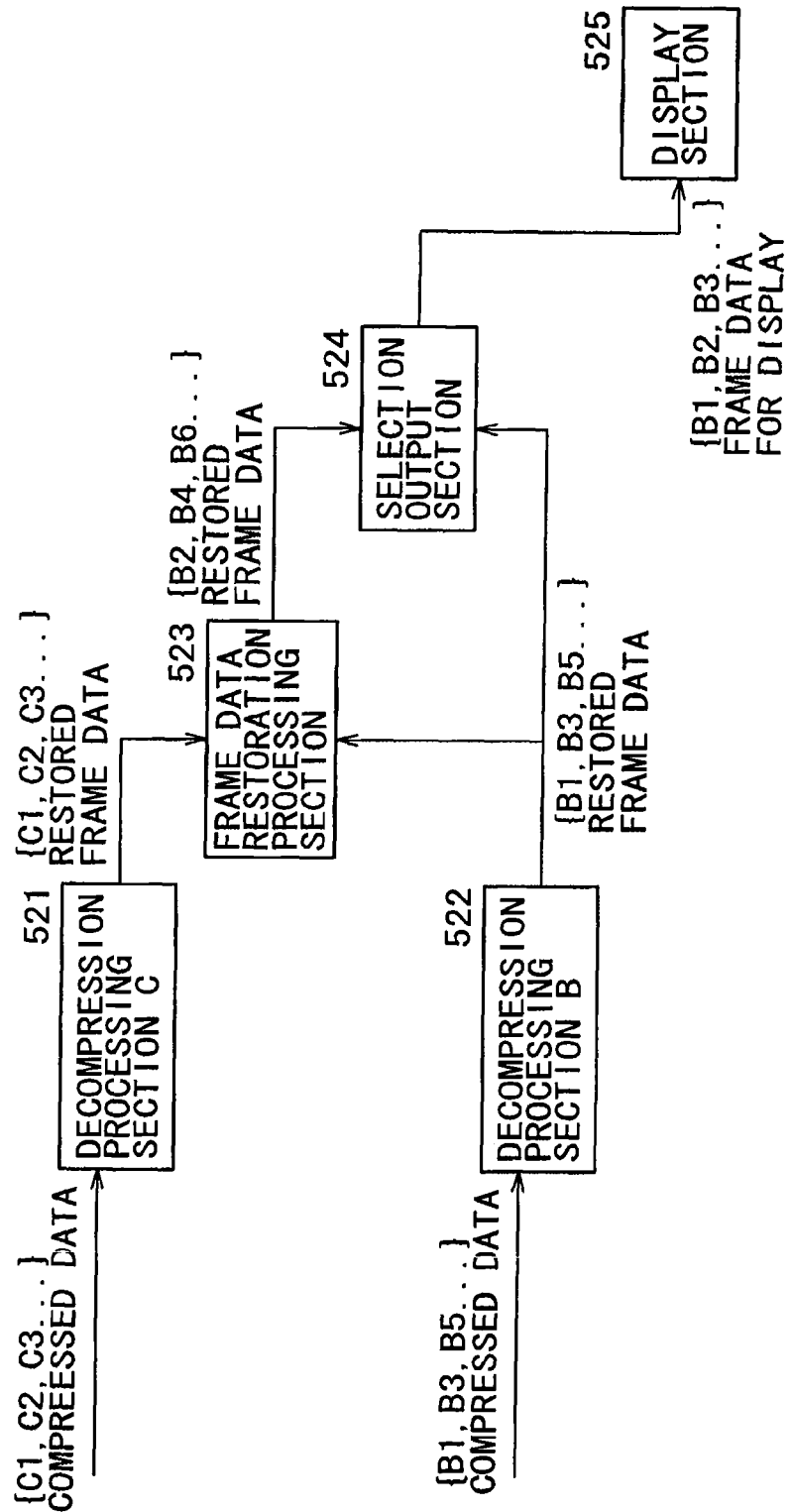
FIG. 15 is a block diagram showing the configuration of a picture processing apparatus for executing a process of receiving picture data having a plurality of layers to generate medium frame rate output picture data.

Next, a configuration example of a picture processing apparatus for executing the process shown in FIG. 14 will be described with reference to FIG. 15. The process described with reference to the flowchart of FIG. 14 can be processed by means of a composite configuration of software and hardware, such as a data processing apparatus equipped with control means including a central processing unit (CPU) and a memory section including a random access memory (RAM), a read only memory (ROM) and the like, examples of which include a PC or the like. The configuration of such a data processing apparatus will be described later. Here, the configuration of a processing apparatus for executing the process shown in FIG. 14 will be described with reference to the functional block diagram of FIG. 15 showing functions executed by a CPU of a PC or the like in blocks.

When the receiving end generates picture data to be outputted to a display section 525 as a picture display device which can display moving pictures only at a frame rate of 60 frames/sec, input data is the first layer data, and the second layer data, namely the compressed data of the 30 frames/sec low frame rate picture group {C1, C2, . . . , Ck, . . . } and the compressed data of the decimated 60 frames/sec medium frame rate picture group {B1, B3, B5, . . . }, respectively.

A decompression processing section C 521 decompresses the first layer data to restore the picture group {C1, C2, . . . , Ck, . . . }. A decompression processing section B 522 decompresses the second layer data to restore the picture group {B1, B3, B5, . . . }. Specifically, decompression is executed, for example, as a decompression process in which MC and IDCT are applied.

A frame data restoration processing section 523 receives the picture group {C1, C2, . . . , Ck, . . . } obtained by decompressing the first layer data and the picture group {B1, B3, B5, . . . } obtained by decompressing the second layer data, and calculates and outputs the picture group {B2, B4, B6, . . . } which is not included in the second layer data, that is, in the 60 frames/sec medium frame rate picture group {B1, B3, B5 . . . }. Specifically, the calculation is carried out in a process that applies the 30 frames/sec low frame rate picture group {C1, C2, C3 . . . } and the 60 frames/sec medium frame rate picture group {B1, B3, B5 . . . } as follows: B2=(2×C1)−B1, B4=(2×C2)−B3, B6=(2×C3)−B5, and so forth.

A selection output section 524 receives the picture group {B1, B3, B5 . . . } restored by the decompression processing section B 522 and the decimated picture group {B2, B4, B6, . . . } restored by the frame data restoration processing section 523 to the display section 512, and alternately outputs the picture group {B1, B3, B5 . . . } and the picture group {B2, B4, B6, . . . } in durations of 1/60 seconds to the display section 525. The display section 525 displays the restored 60 frames/sec medium frame rate picture group {B1, B2, B3, B4, . . . , Bm, . . . } in durations of 1/60 seconds, that is, at a frame rate of 60 frames/sec in accordance with the frame rate processable by the display device.

Figure 16:
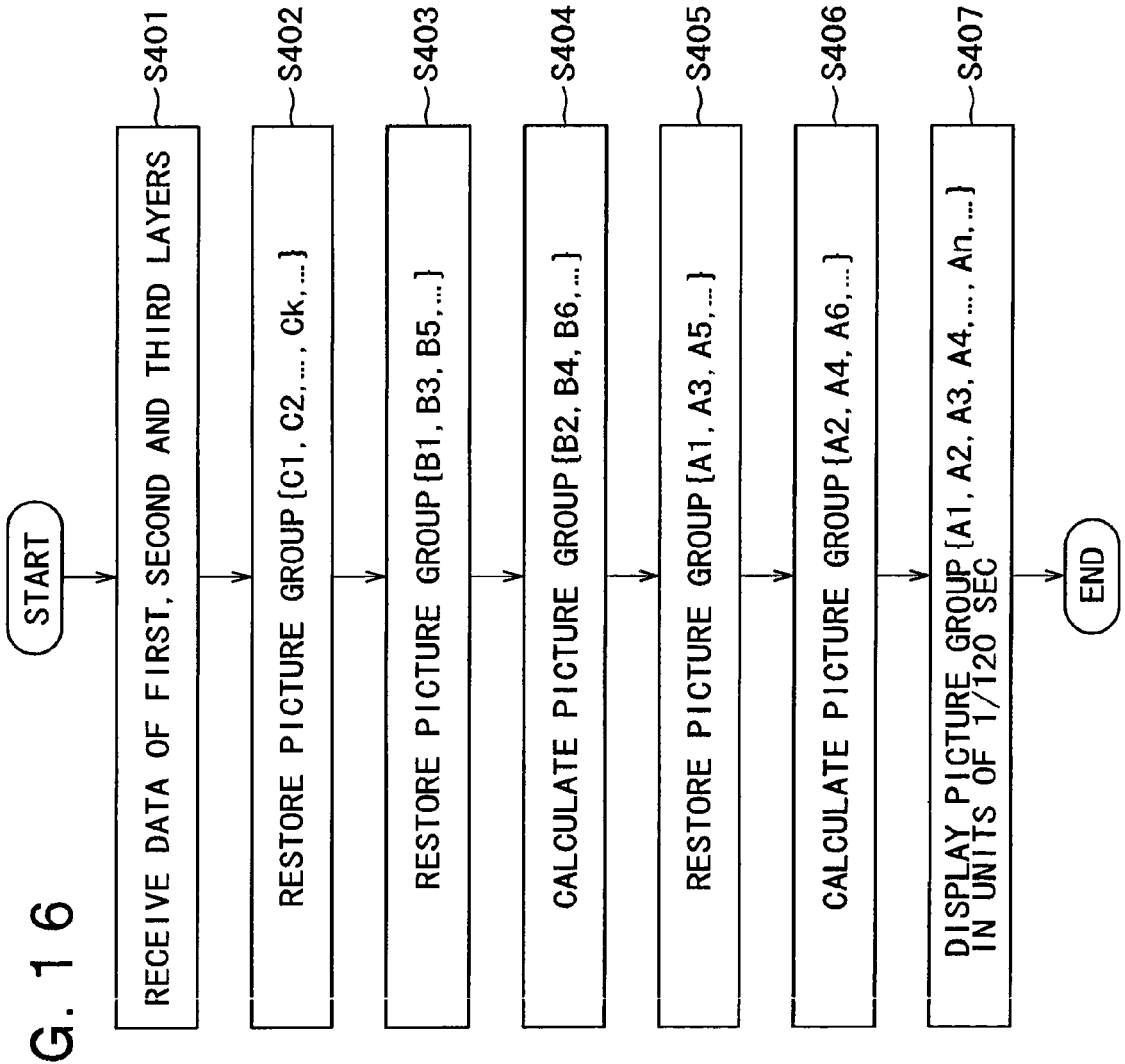
FIG. 16 is a flowchart illustrating a procedure for receiving picture data having a plurality of layers to generate high frame rate output picture data.

Next, a process in a case where the receiving end generates picture data to be displayed on a picture display device which is capable of displaying moving pictures at a frame rate of 120 frames/sec is described with reference to the flowchart shown in FIG. 16. First, in step S401 of FIG. 16, on the data receiving end, the first layer data, the second layer data, and the third layer data, that is, the compressed data of the 30 frames/sec low frame rate picture group {C1, C2, . . . , Ck, . . . }, the compressed data of the 60 frames/sec medium frame rate picture group {B1, B3, B5, . . . }, and the compressed data of the 120 frames/sec high frame rate picture group {A1, A3, A5 . . . }, respectively, are received. In the case of distribution via a storage medium, the storage medium is read and the first layer data, the second layer data and the third layer data are extracted.

Then, in step S402, the picture group {C1, C2, . . . , Ck, . . . } is restored by decompressing the first layer data. Specifically, decompression is executed through, for example, MC and IDCT. Then in S403, the picture group {B1, B3, B5, . . . } is restored by decompressing the second layer data. Specifically, decompression is executed through, for example, MC and IDCT. In so doing, if necessary, the picture data {B1, B3, B5, . . . } is restored using the picture group {C1, C2, . . . , Ck, . . . } restored in step S402.

Then, in step S404, the picture group {B2, B4, B6, . . . }, which is not included in the 60 frames/sec medium frame rate picture group {B1, B3, B5, . . . } received as the second layer data, is calculated. Specifically, the calculation is carried out in a process that applies the 30 frames/sec low frame rate picture group {C1, C2, C3 . . . } restored in step S402 and the 60 frames/sec medium frame rate picture group {B1, B3, B5 . . . } restored in step S303 as follows: B2=(2×C1)−B1, B4=(2×C2)−B3, B6=(2×C3)−B5, and so forth.

When the 60 frames/sec medium frame rate picture group is reproduced as continuous frames in step S404, the process proceeds to step S405. In step S405, the picture group {A1, A3, A5, . . . } is restored by decompressing the third layer data. Specifically, decompression is executed through, for example, MC and IDCT. In so doing, if necessary, the picture data {A1, A3, A5, . . . } is restored using the picture group {C1, C2, . . . , Ck, . . . } restored in step S402 and the picture group {B1, B2, . . . , Bm, . . . } restored in steps S403 and S404.

Then, in step S406, the 120 frames/sec high frame rate picture group {A2, A4, A6, . . . } not included in the third layer data is calculated. Specifically, the calculation is carried out in a process that applies the 60 frames/sec medium frame rate picture group {B1, B2, B3 . . . } restored in steps S403 and S404, and the 120 frames/sec high frame rate picture group {A1, A3, A5 . . . } restored in step S405 as follows: A2=(2×B1)−A1, A4=(2×B2)−A3, A6=(2×B3)−A5, and so forth.

When the 120 frames/sec high frame rate picture group is reproduced as continuous frames in step S406, the process proceeds to step S407. In step S407, the picture group {A1, A2, A3, A4, . . . , An, . . . } restored in steps S405 and S406 are sequentially displayed from picture A1 in durations of 1/120 seconds on the display device.

The moving picture composed of the picture group {A1, A2, A3, A4, . . . , An, . . . } has the frame rate of 120 frames/sec, and each picture is equivalent to a picture taken with an exposure time of 1/120 seconds. When a moving object is filmed, each picture has a motion blur of 1/120 seconds, and because the moving picture is displayed at a frame rate of 120 frames/sec, the movement of the displayed picture is smooth.

Figure 17:
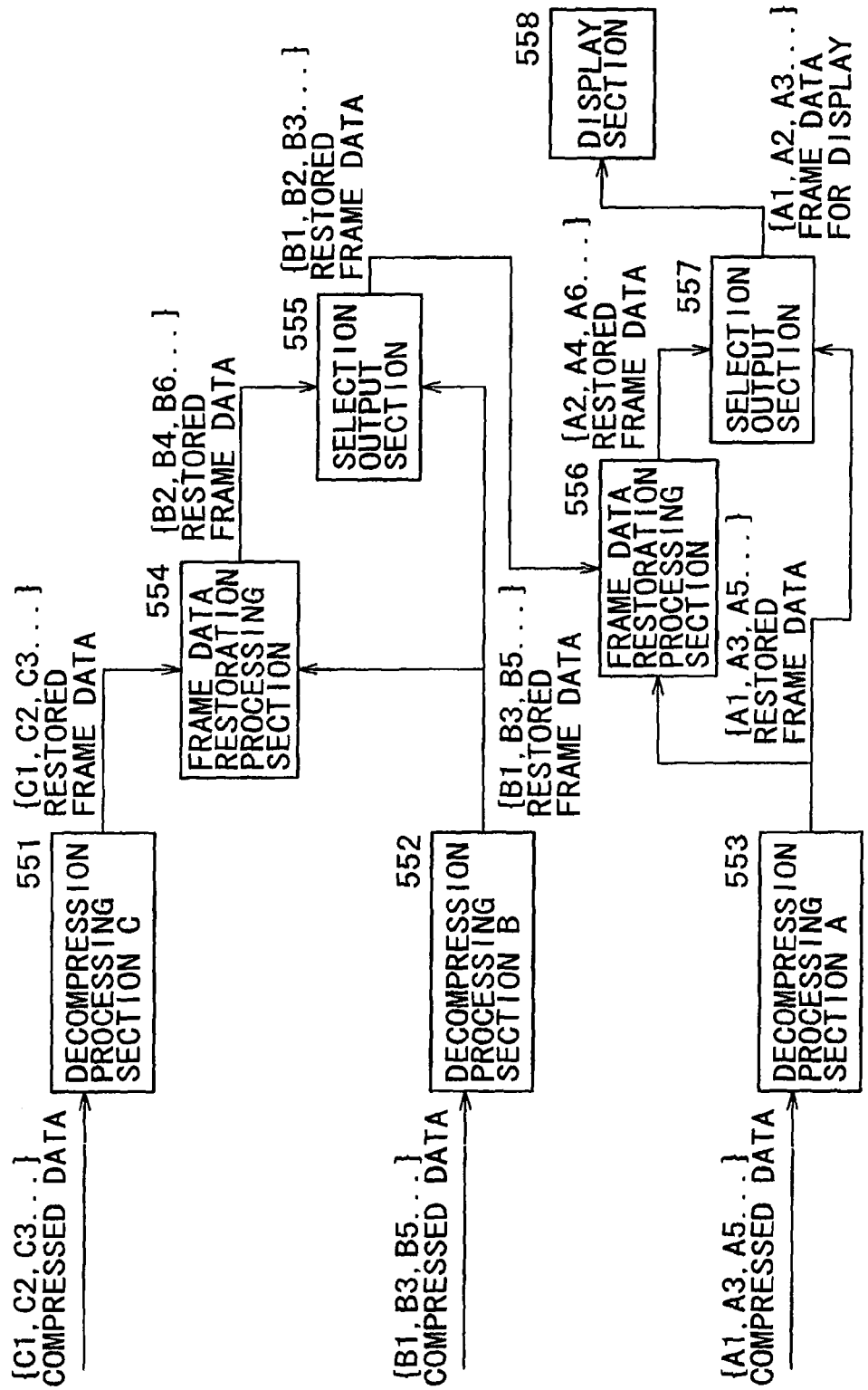
FIG. 17 is a block diagram showing the configuration of a picture processing apparatus for executing a process of receiving picture data to generate high frame rate output picture data.
Figure 18:
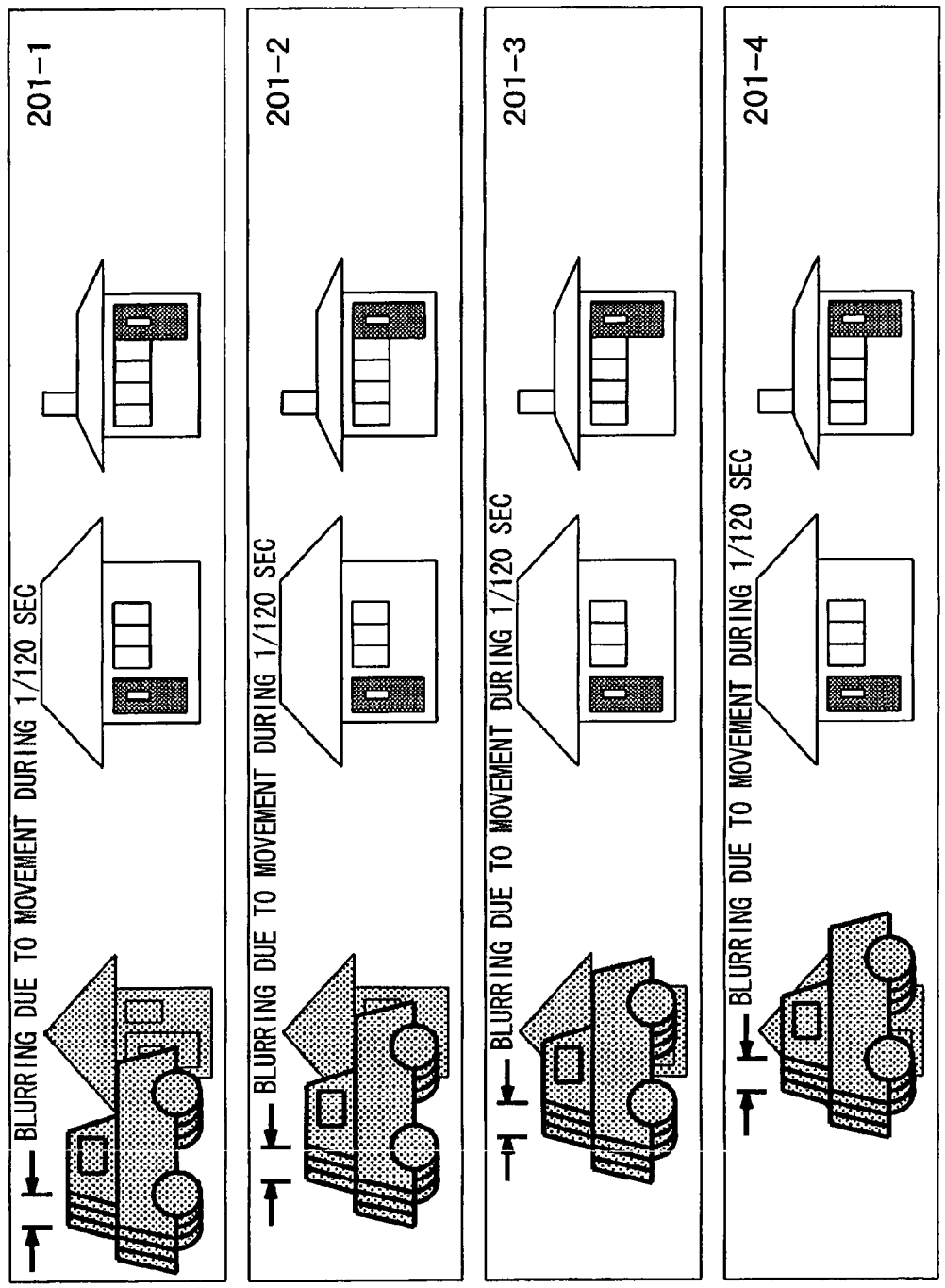
FIG. 18 is a diagram illustrating a display example of picture data having a high frame rate (120 frames/sec) which is generated by applying a process according to an embodiment of the present invention.
Figure 19:
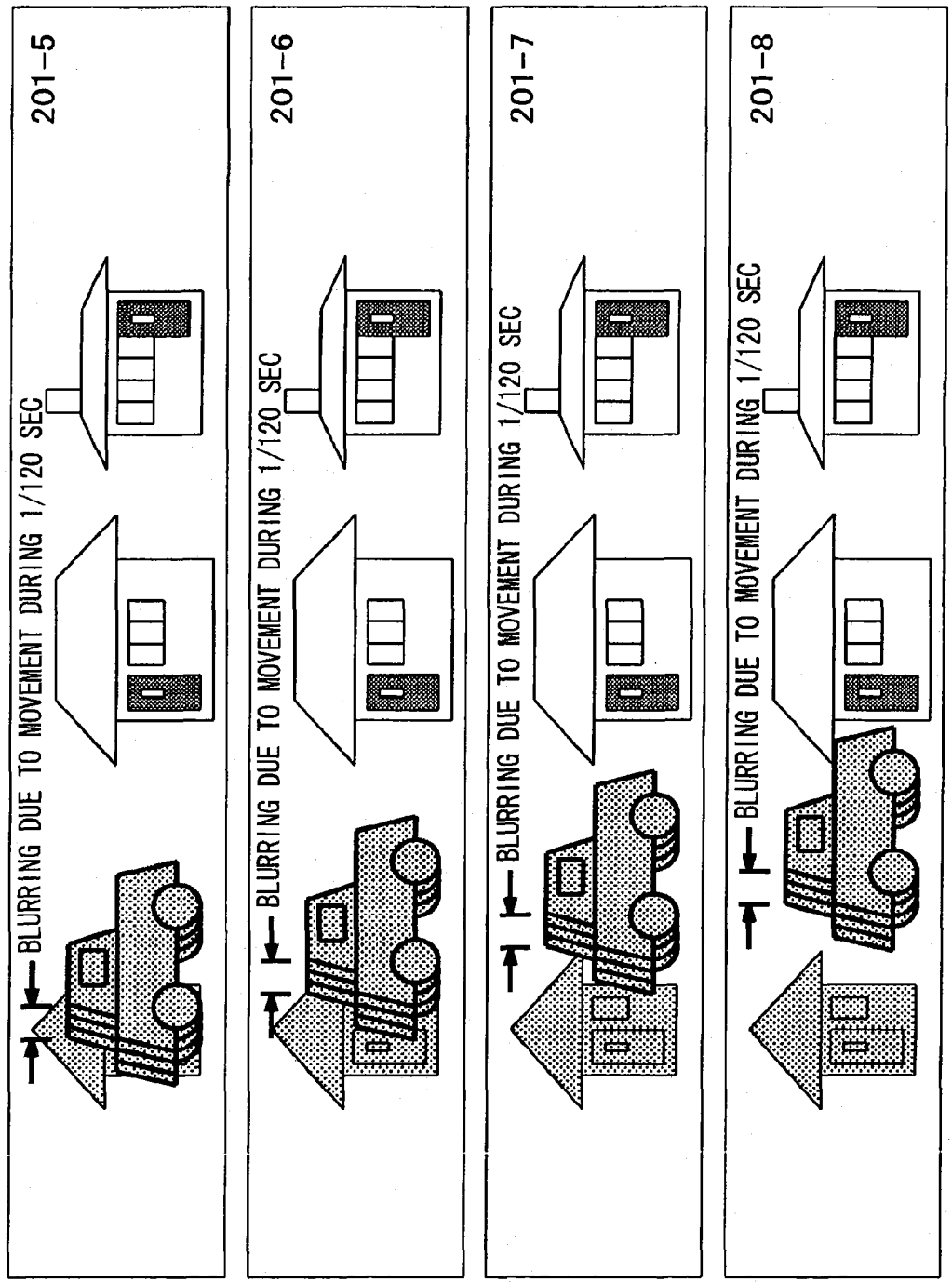
FIG. 19 is a diagram illustrating a display example of picture data having a high frame rate (120 frames/sec) which is generated by applying a process according to an embodiment of the present invention.
Figure 20:
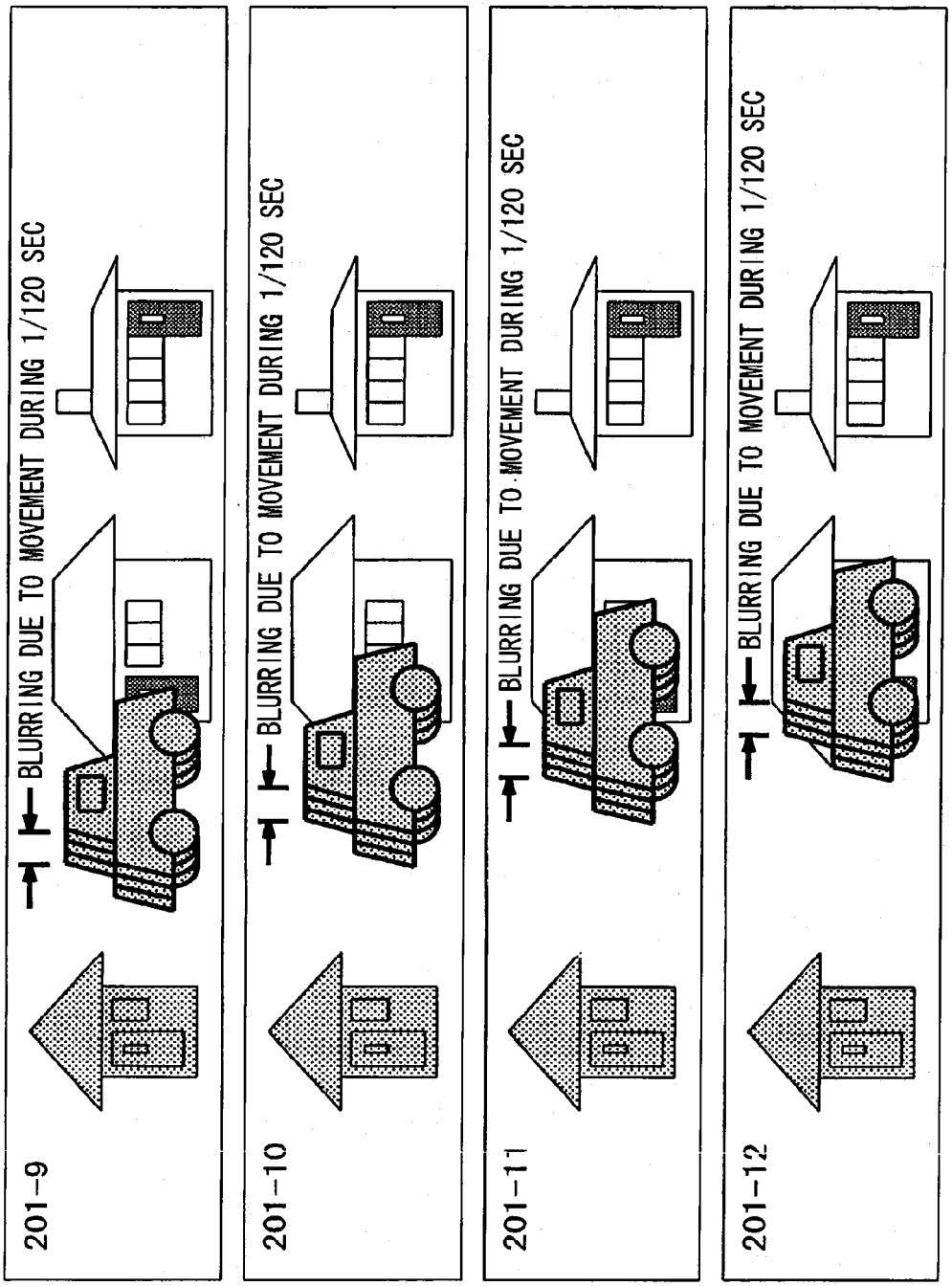
FIG. 20 is a diagram illustrating a display example of picture data having a high frame rate (120 frames/sec) which is generated by applying a process according to an embodiment of the present invention.
Figure 21:
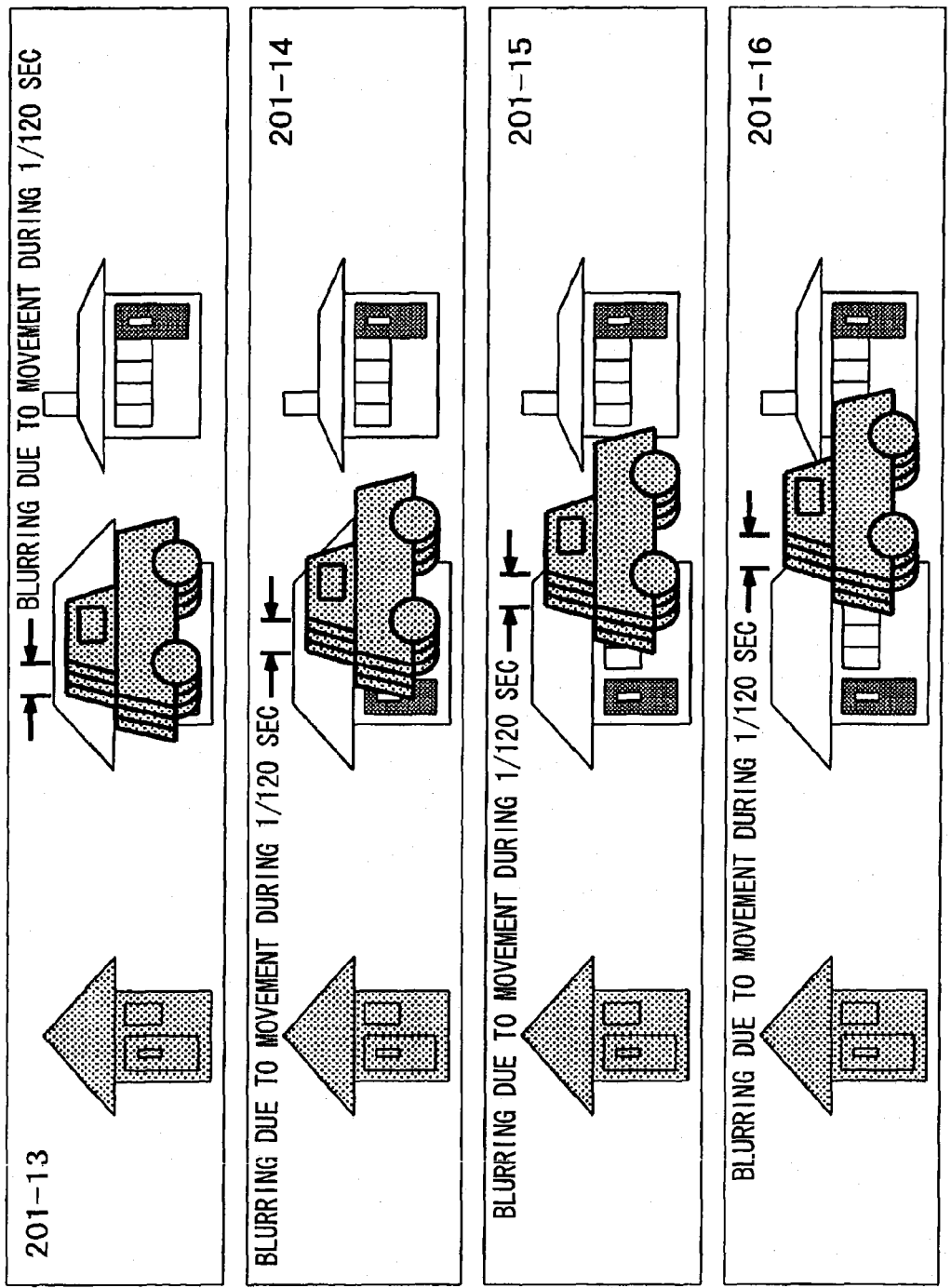
FIG. 21 is a diagram illustrating a display example of picture data having a high frame rate (120 frames/sec) which is generated by applying a process according to an embodiment of the present invention.
Figure 22:
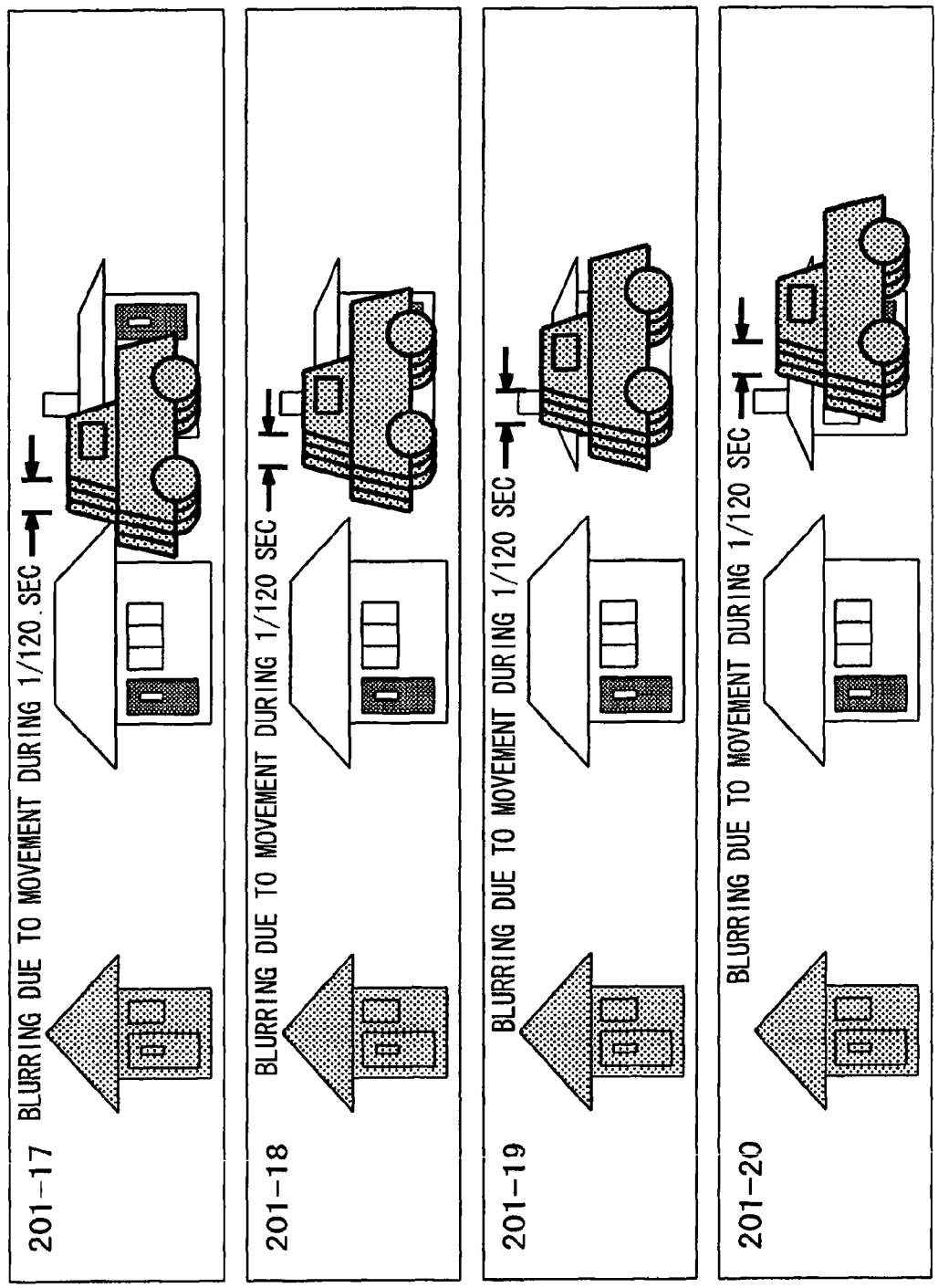
FIG. 22 is a diagram illustrating a display example of picture data having a high frame rate (120 frames/sec) which is generated by applying a process according to an embodiment of the present invention.
Figure 23:
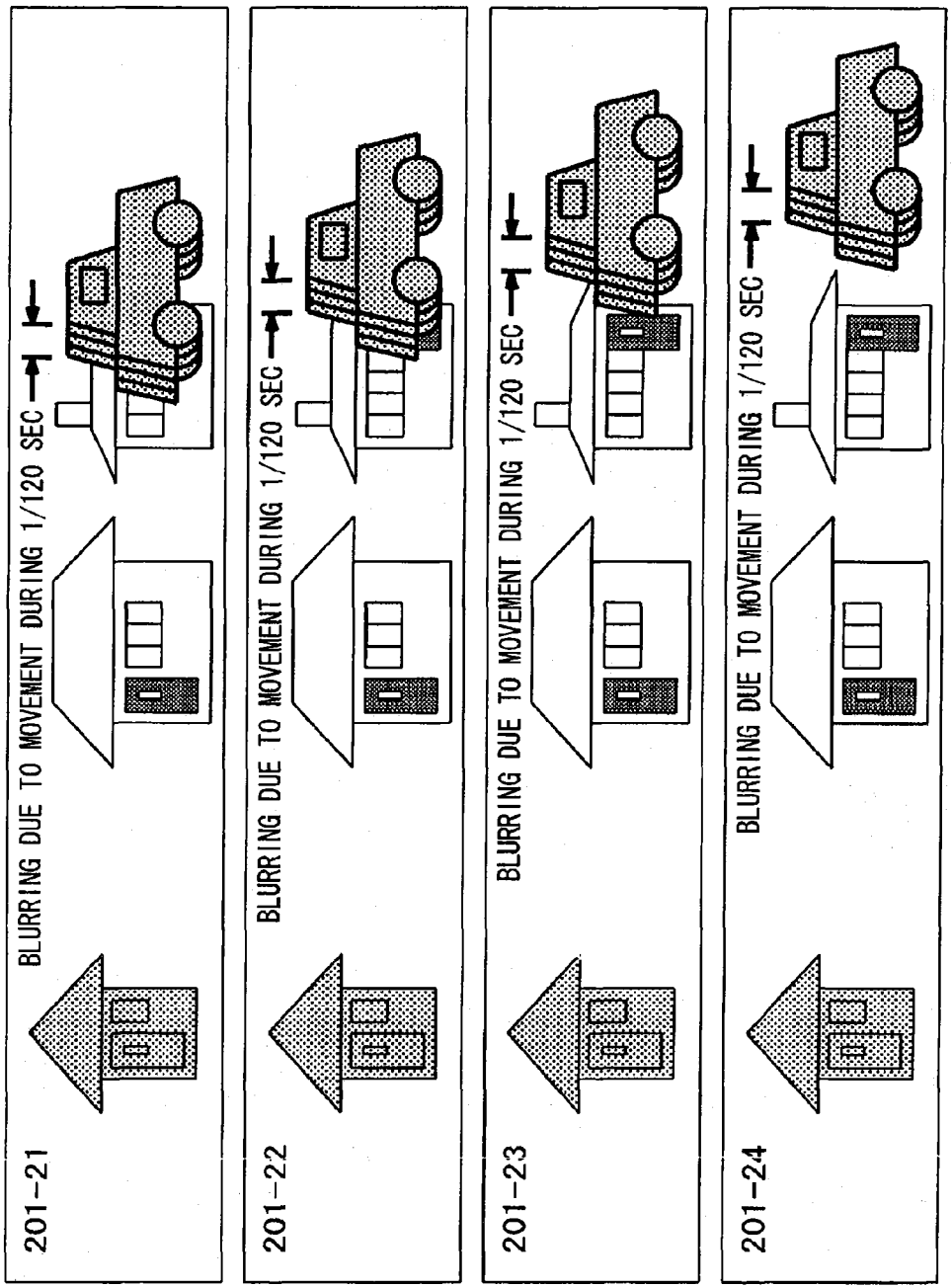
FIG. 23 is a diagram illustrating a display example of picture data having a high frame rate (120 frames/sec) which is generated by applying a process according to an embodiment of the present invention.
Figure 24:
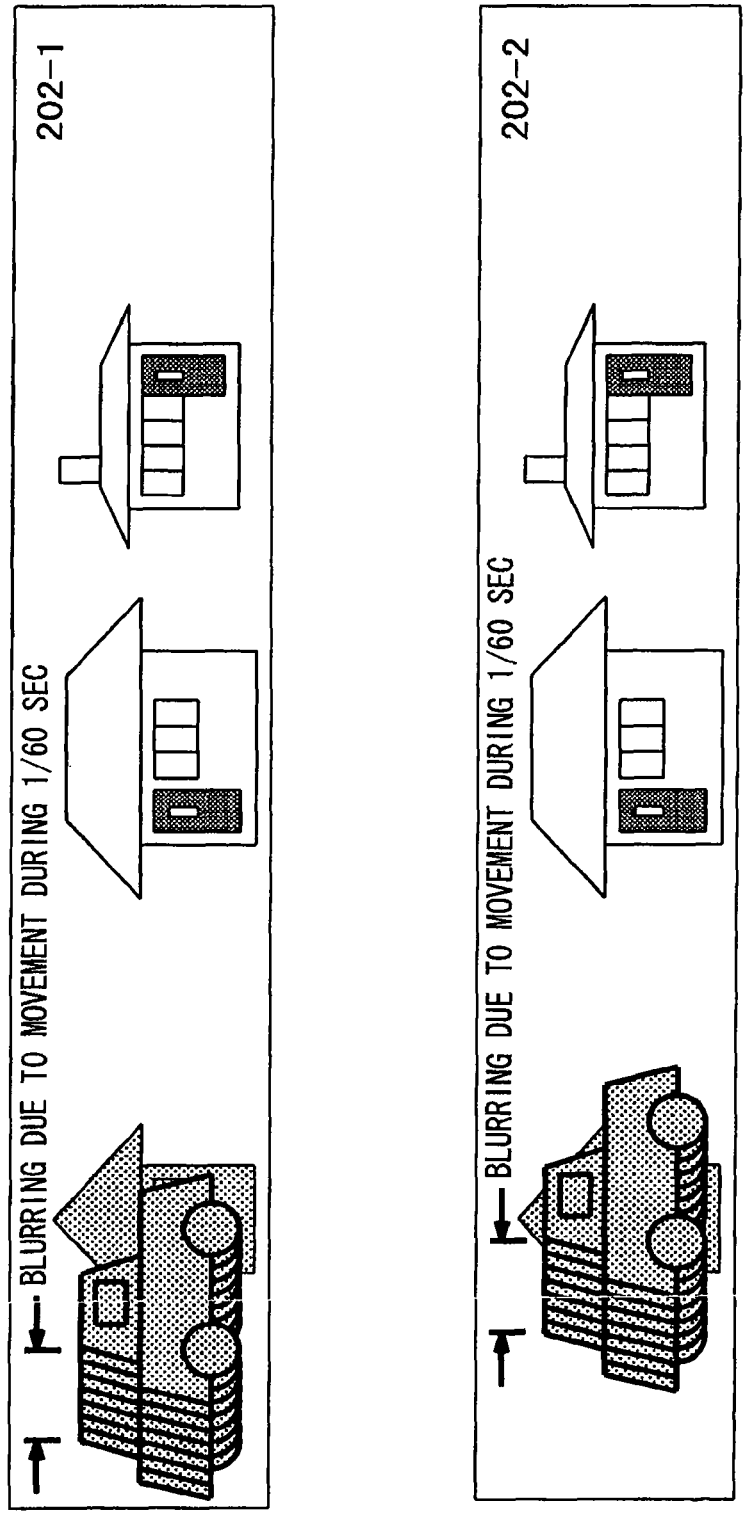
FIG. 24 is a diagram illustrating a display example of picture data having a medium frame rate (60 frames/sec) which is generated by applying a process according to an embodiment of the present invention.
Figure 26:
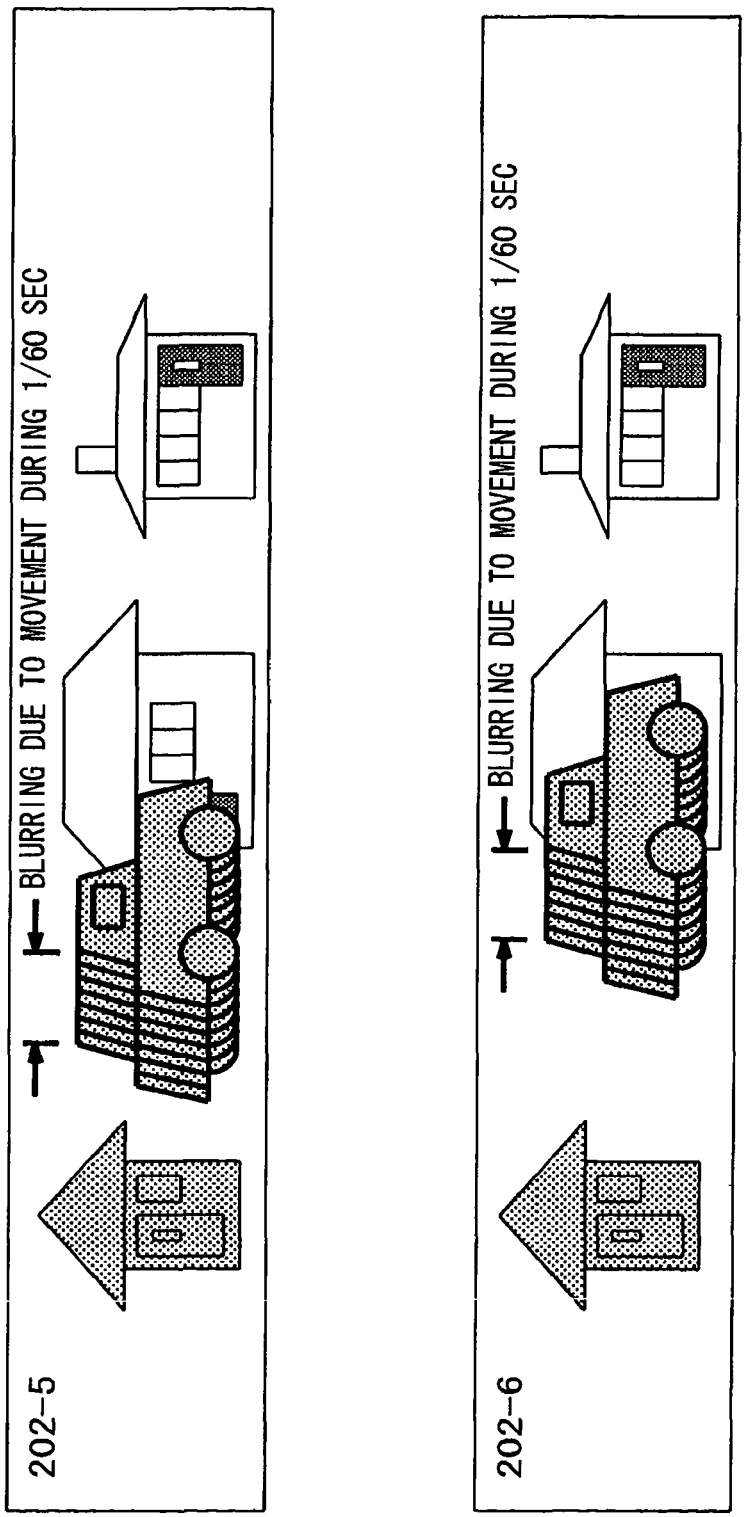
FIG. 26 is a diagram illustrating a display example of picture data having a medium frame rate (60 frames/sec) which is generated by applying a process according to an embodiment of the present invention.
Figure 27:
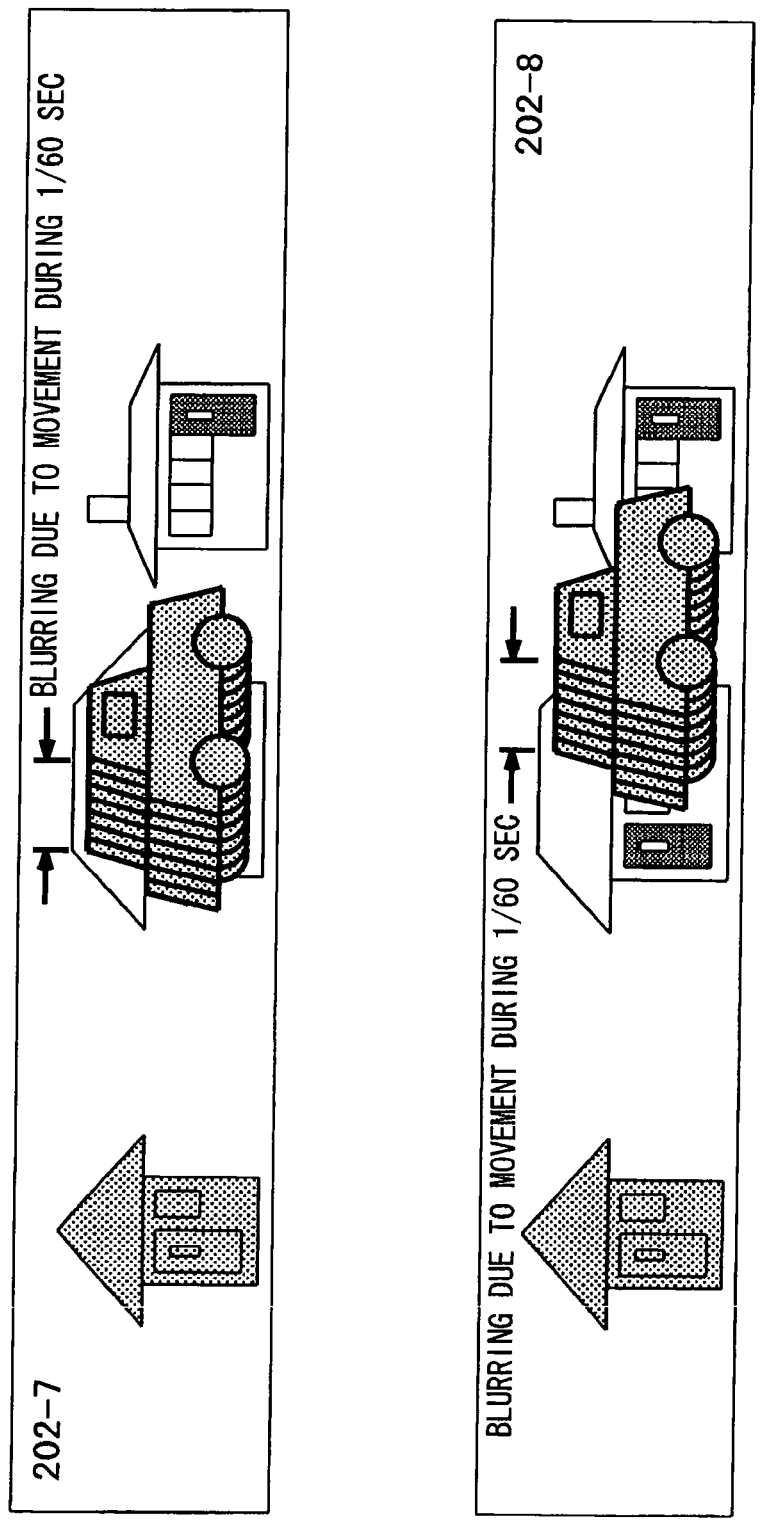
FIG. 27 is a diagram illustrating a display example of picture data having a medium frame rate (60 frames/sec) which is generated by applying a process according to an embodiment of the present invention.
Figure 28:
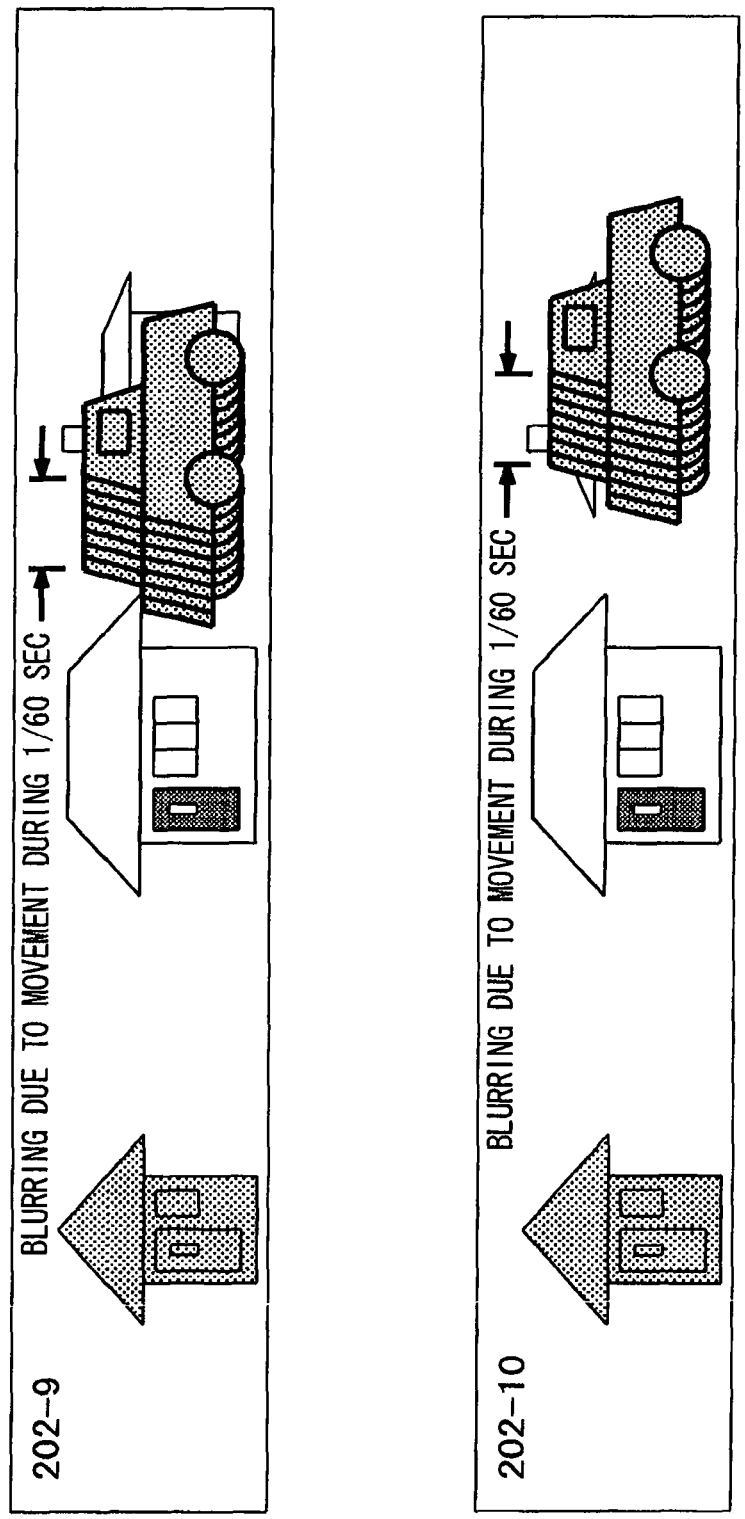
FIG. 28 is a diagram illustrating a display example of picture data having a medium frame rate (60 frames/sec) which is generated by applying a process according to an embodiment of the present invention.

Next, a configuration example of a picture processing apparatus for executing the process shown in FIG. 16 will be described with reference to FIG. 17. The process described with reference to the flowchart of FIG. 16 can be processed by means of a composite configuration of software and hardware, such as a data processing apparatus equipped with control means including a central processing unit (CPU) and a memory section including a random access memory (RAM), a read only memory (ROM) and the like, examples of which include a PC or the like. The configuration of such a data processing apparatus will be described later. Here, the configuration of a processing apparatus for executing the process shown in FIG. 16 will be described with reference to the functional block diagram of FIG. 17 showing functions executed by a CPU of a PC or the like in blocks.

When the receiving end generates picture data to be outputted to a display section 558 as a picture display device which can display moving pictures at a frame rate of 120 frames/sec, input data is the first layer data, the second layer data, and the third layer data, namely the compressed data of the 30 frames/sec low frame rate picture group {C1, C2, . . . , Ck, ... }, the compressed data of the decimated 60 frames/sec medium frame rate picture group {B1, B3, B5, ... } and the decimated 120 frames/sec high frame rate picture group {A1, A3, A5 ... }, respectively.

A decompression processing section C 551 decompresses the first layer data to restore the picture group {C1, C2, ..., Ck, ... }. A decompression processing section B 522 decompresses the second layer data to restore the picture group {B1, B3, B5, ... }. A decompression processing section A 553 decompresses the third layer data to restore the picture group {A1, A3, A5 ... }. Specifically, decompression is executed, for example, through a decompression process in which MC and IDCT are applied.

A frame data restoration processing section 554 receives the picture group {C1, C2, ..., Ck, ... } obtained by decompressing the first layer data and the picture group {B1, B3, B5, ... } obtained by decompressing the second layer data, and calculates and outputs the picture group {B2, B4, B6, ... } which is not included in the second layer data, that is, in the 60 frames/sec medium frame rate picture group {B1, B3, B5 ... }. Specifically, the calculation is carried out in a process that applies the 30 frames/sec low frame rate picture group {C1, C2, C3 ... } and the 60 frames/sec medium frame rate picture group {B1, B3, B5 ... } as follows: B2=(2×C1)−B1, B4=(2×C2)−B3, B6=(2×C3)−B5, and so forth.

A selection output section 555 receives the picture group {B1, B3, B5 ... } restored by the decompression processing section B 552 and the decimated picture group {B2, B4, B6, ... } restored by the frame data restoration processing section 554, and outputs to a frame data restoration processing section 556 the medium frame rate picture group {B1, B2, B3 ... } in which the frames are sorted in order.

The frame data restoration processing section 556 receives the medium frame rate picture group {B1, B2, B3, ... } inputted from the selection output section 555 and the decimated picture group {A1, A3, A5, ... } obtained by decompressing the third layer data at the decompression processing section A553, and calculates and outputs the picture group {A2, A4, A6, ... } which is not included in the received third layer data {A1, A3, A5 ... }. Specifically, the calculation is carried out in a process that applies the 60 frames/sec medium frame rate picture group {B1, B2, B3 ... } and the 120 frames/sec high frame rate picture group {A1, A3, A5 ... } as follows: A2=(2×B1)−A1, A4=(2×B2)−A3, A6=(2×B3)−A5, and so forth.

A selection output section 557 receives the picture group {A1, A3, A5 ... } restored by the decompression processing section A 553 and the picture group {A2, A4, A6, ... } of the decimated pictures restored by the frame data restoration processing section 556, and outputs them alternately in durations of $1/120$ seconds to the display section 558 as the high frame rate picture group {A1, A2, A3 ... } sorted in order. The display section 558 displays the restored 120 frames/sec high frame rate picture group {A1, A2, A3, A4, ... } in durations of $1/120$ seconds, that is, at a frame rate of 120 frames/seconds in accordance with the frame rate processable by the display device.

Next, how the picture groups {A1, A2, ..., An, ... }, {B1, B2, ..., Bm, ... } and {C1, C2, ..., Ck, ... } are each displayed on the display device is described with reference to FIG. 18 through FIG. 30. Picture data 201-1 to 201-24 shown in FIGS. 18 through 23 shows each displayed frame of a moving picture which has a frame rate of 120 frames/sec, and in which each picture is taken with an exposure time of $1/120$ seconds. The moving picture is one in which a vehicle moving at a high speed from the left to the right is captured. In the figures, 201-1, 201-2, ... each correspond to pictures A1, A2, ..., respectively. Since each picture is taken with an exposure time of $1/120$ seconds, motion blur corresponding to the distance by which the vehicle moved in $1/120$ seconds is present.

The picture frame data 201-1 to 201-24 shown in FIGS. 18 through 23 are picture frame data generated on the basis of the data of the first layer to the data of the third layer in accordance with the process described with reference to FIG. 16. In other words, the picture frame data 201-1 to 201-24 sequentially show the high frame rate picture group {A1, A2, A3, A4, A5 ... } generated on the basis of the compressed data of the 30 frames/sec low frame rate picture group {C1, C2, ..., Ck, ... }, the compressed data of the decimated 60 frames/sec medium frame rate picture group {B1, B3, B5 ... }, and the compressed data of the decimated 120 frames/sec high frame rate picture group {A1, A3, A5 ... }.

The pictures in the high frame rate picture group {A1, A2, A3, A4, A5, ... } correspond to the original pictures taken with an exposure time of $1/120$ seconds, and each have motion blur of the distance by which the vehicle moved in $1/120$ seconds. Consequently, the picture group {A1, A2, A3, A4, A5, ... } is displayed as a smooth high frame rate moving picture.

The picture frame data 202-1 to 202-12 shown in FIGS. 24 through 29 show each displayed frame of a picture corresponding to a moving picture having a frame rate of 60 frames/sec, and in which each picture is taken with an exposure time of $1/60$ seconds. The picture frame data 202-1, 202-2, ... in the figures correspond to the pictures B1, B2, ..., respectively. Since each picture is equivalent to a picture taken with an exposure time of $1/60$ seconds, there is motion blur of a distance by which the vehicle moved in $1/60$ seconds.

The picture frame data 202-1 to 202-12 shown in FIGS. 24 through 29 are the picture frame data generated on the basis of the data of the first layer and the data of the second layer in accordance with the process described with reference to FIG. 14. In other words, the picture frame data 202-1 to 202-12 sequentially show the medium frame rate picture group {B1, B2, B3, B4, ... } generated on the basis of the compressed data of the 30 frames/sec low frame rate picture group {C1, C2, ..., Ck, ... }, and the compressed data of the decimated 60 frames/sec medium frame rate picture group {B1, B3, B5 ... }.

The medium frame rate picture group {B1, B2, B3, B4, ... } is equivalent to a moving picture taken with an exposure time of $1/60$ seconds, and has motion blur of the distance by which the vehicle moved in $1/60$ seconds. Consequently, the picture group {B1, B2, B3, B4, ... } is displayed as a smooth medium frame rate moving picture.

In other words, the displayed medium frame rate picture group {B1, B2, B3, B4, ... } is, as described above, a picture group in which the average value "$(A_{2m-1}+A_{2m})\div2$" of picture data $A_{2m-1}$ and $A_{2m}$ constituting the original 120 frames/sec high frame rate moving picture is taken to be picture data Bm constituting the 60 frames/sec medium frame rate moving picture. Thus, a moving body in the displayed picture has motion blur of the distance by which the moving body moved in $1/60$ seconds, and the medium frame rate picture group {B1, B2, B3, B4, ... } is displayed as a smooth medium frame rate moving picture.

Figure 30:
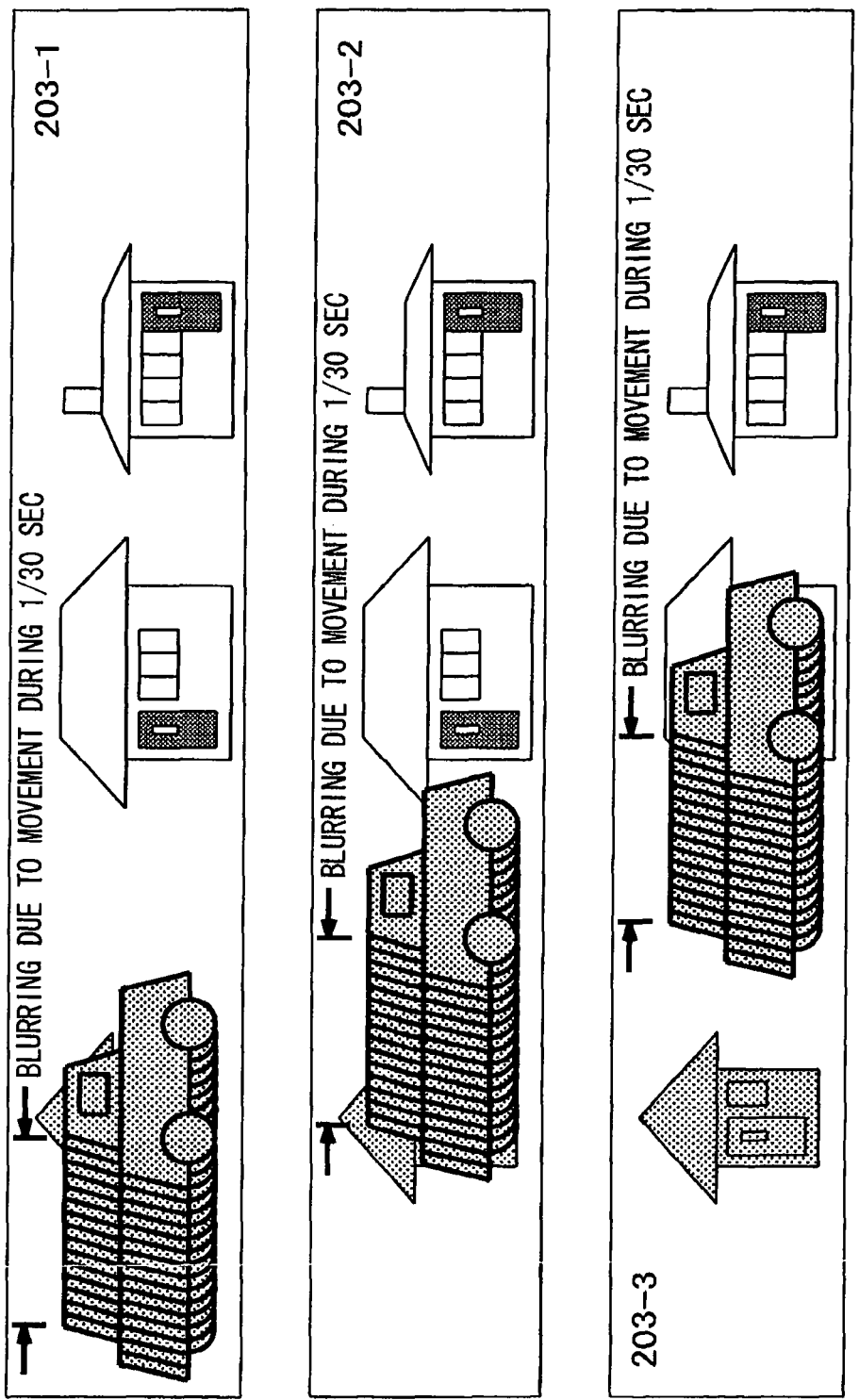
FIG. 30 is a diagram illustrating a display example of picture data having a low frame rate (30 frames/sec) which is generated by applying a process according to an embodiment of the present invention.

The picture frame data 203-1 to 203-6 shown in FIGS. 30 and 31 show each displayed frame of a moving picture corresponding to a moving picture having a frame rate of 30 frames/sec, and in which each picture is taken with an exposure time of $1/30$ seconds. The picture frame data 203-1, 203-2, ... in the figures correspond to the pictures C1, C2, . . . , respectively. Since each picture is equivalent to a picture taken with an exposure time of 1/30 seconds, there is motion blur of a distance by which the vehicle moved in 1/30 seconds.

The picture frame data 203-1 to 203-6 shown in FIGS. 30 and 31 are the picture frame data generated on the basis of the first layer data in accordance with the process described with reference to FIG. 12. In other words, the picture frame data 203-1 to 203-6 sequentially show the low frame rate picture group {C1, C2, C3, . . . } generated on the basis of the compressed data of the 30 frames/sec low frame rate picture group {C1, C2, . . . , Ck, . . . }.

The low frame rate picture group {C1, C2, C3, . . . } is equivalent to a moving picture taken with an exposure time of 1/30 seconds, and has motion blur of the distance by which the vehicle moved in 1/30 seconds. Consequently, the picture group {C1, C2, C3, . . . } is displayed as a smooth low frame rate moving picture.

In other words, the displayed low frame rate picture group {C1, C2, C3, . . . } is, as described above, a picture group in which the average value "$(A_{2m-1}+A_{2m}) \div 2$" of picture data $A_{2m-1}$ and $A_{2m}$ constituting the original 120 frames/sec high frame rate moving picture is taken to be picture data Bm constituting the 60 frames/sec medium frame rate moving picture, and further, is a picture group in which the average value "$(B_{2k-1}+B_{2k}) \div 2$" of the thus generated picture data $B_{2k-1}$ and $B_{2k}$ constituting the 60 frames/sec medium frame rate moving picture is taken to be picture data Ck constituting the 30 frames/sec low frame rate moving picture. Thus, a moving body in the displayed picture has motion blur of the distance by which the moving body moved in 1/30 seconds, and the low frame rate picture group {C1, C2, C3, . . . } is displayed as a smooth low frame rate moving picture.

As described above, in embodiments of the present invention, it becomes possible to use pictures of a plurality of frame rate layers generated on the basis of a plurality of temporally continuous pictures of an original high frame rate moving picture as transmission data or data to be provided, and to generate picture data adapted to a plurality of different display frame rates on the basis of the provided data.

Moreover, it becomes possible to generate motion blur corresponding to the reproduction frame rates of the reproduced pictures. Consequently, smooth reproduction and displaying of pictures adapted to the respective reproduction frame rates are executed.

Moreover, as understood from the above descriptions, for data of the high frame rate picture group or the medium frame rate picture group other than the data of the picture group corresponding to the lowest frame rate picture group in the data of a plurality of layers, only the decimated picture frame data need be transmitted. Consequently, it is possible to reduce the amount of data to be transmitted.

Specifically, it is possible to obtain the high frame rate picture data A2 (201-2 in the figures) by subtracting the high frame rate picture data A1 (201-1 in the figures) from the medium frame rate picture data B1 (202-1 in the figures). Consequently, it is unnecessary to transmit data concerning the high frame rate picture data A2 as third layer data.

Moreover, it is possible to obtain the medium frame rate picture data B2 (202-2 in the figures) by subtracting the medium frame rate picture data B1 (202-1 in the figures) from the low frame rate picture data C1 (203-1 in the figures). Consequently, it is unnecessary to transmit data concerning the medium frame rate picture data B2 as second layer data.

Thus, by applying the present invention, it is possible to smoothly display a 30 frames/sec moving picture composed of pictures having a 1/30 sec motion blur using only the first layer data. Moreover, it is possible to smoothly display a 60 frames/sec moving picture composed of pictures having a 1/60 sec motion blur using only the first layer data and the second layer data.

When the receiving end can display a moving picture at a frame rate of 120 frames/sec, it is possible to smoothly display a 120 frame/sec moving picture composed of pictures having a 1/120 sec motion blur using the first layer data, the second layer data and the third layer data.

In the embodiments described above, an example for processing pictures of three kinds of frame rates, namely 120 frames/sec as the high frame rate picture data, 60 frames/sec as the medium frame rate picture data, and 30 frames/sec as the low frame rate picture data is given. However, the configuration of the present invention is equally applicable to combinations of various different frame rates other than the combination of the three frame rates shown in the embodiments, and in such cases, similar advantages can still be obtained.

A configuration example of transmission data of a combination of a plurality of frame rates is described with reference to FIG. 32A and FIG. 32B. FIG. 32A shows picture frame data in which pictures of two kinds of frame rates, namely 120 frames/sec as the high frame rate picture data and 40 frames/sec as the low frame rate picture data, are set as transmission data.

The 40 frames/sec picture data as the low frame rate picture data {Q1, Q2, Q3, . . . } is generated on the basis of the high frame rate picture data {P 1, P2, P3, . . . } as follows: Q1=P1, Q2=(P2+P3+P4)/3, Q3=(P5+P6+P7)/3, . . . and so forth.

In this case, in the transmission data, the first layer data is compressed data of each 40 frames/sec picture data {Q1, Q2, Q3, . . . }. The second layer data of the transmission data is data in which picture data that is calculable on the receiving end is decimated from the 120 frames/sec picture data, that is, the second layer data is compressed data of the picture data {P1, P2, P4, . . . } in which the picture data P3, P6, P9, . . . shown in the figure are decimated.

FIG. 32B shows picture frame data in which pictures of two kinds of frame rates, namely 120 frames/sec as the high frame rate picture data and 30 frames/sec as the low frame rate picture data, are set as transmission data.

The 30 frames/sec picture data as the low frame rate picture data {R1, R2, R3, . . . } is generated on the basis of the high frame rate picture data {P1, P2, P3, . . . } as follows: R1=P1, R2=(P2+P3+P4+P5)/4, R3=(P6+P7+P8+P9)/4, . . . and so forth.

In this case, in the transmission data, the first layer data is compressed data of each 30 frames/sec picture data {R1, R2, R3, . . . }. The second layer data of the transmission data is data in which picture data that is calculable on the receiving end is decimated from the 120 frames/sec picture data, that is, the second layer data is compressed data of the picture data {P1, P2, P3, P5, . . . } in which the picture data P4, P8, P12, . . . shown in the figure are decimated. Thus, the configuration of the present invention can be applied to transmission of picture data of various frame rates.

Next, a hardware configuration example of a picture processing apparatus for executing the process of generating and transmitting the picture data composed of the plurality of layers mentioned above, and a picture processing apparatus for executing the process of receiving the picture data composed of the plurality of layers mentioned above and of generating and displaying picture data matching the frame rate processable by its display device will be described with reference to FIG. 33.

As described above, the process shown in FIGS. 10, 12, 14 and 16 can be executed by means of a composite configuration of software and hardware, such as a data processing apparatus equipped with control means including a central processing unit (CPU) and a memory section including a random access memory (RAM), a read only memory (ROM) and the like, examples of which include a PC or the like. A specific example of the configuration of such a data processing apparatus embodied by a PC or the like will be described with reference to FIG. 33. A concrete example of the configuration of the data processing apparatus realized by a PC or the like is described with reference to FIG. 33.

A CPU 701, which is a main controller of a picture processing apparatus 700, executes various applications under the control of an operating system (OS). A moving picture having a frame rate of, for example, 120 frames/sec, which has been taken with a video camera 713, is downloaded to a hard disk drive (HDD) 711 via an external device interface 706.

In order to generate picture data composed of a plurality of layers from the originally obtained picture, the CPU 701 executes, for example, an application program (the process flow in FIG. 10) for generating the first layer, the second layer and the third layer data from the moving picture downloaded to the HDD 711, and generates picture data of a plurality of layers.

Moreover, in order to receive picture data of a plurality of layers and to generate picture data corresponding to the frame rate of the display process, the CPU 701 executes an application program (corresponding to the process flow of FIG. 12, 14 or 16) for generating, depending on the display ability, a moving picture having the frame rate of 30 frames/sec, 60 frames/sec or 120 frames/sec from the data of the first layer, the second layer and the third layer transmitted via a network interface 705.

As shown in the figure, the CPU 701 is interconnected with other devices, which will be described later, through a bus 707. A memory 702 is a storage device to be used for storing program codes to be executed by the CPU 701 and for temporarily storing work data under execution. It should be understood that the memory 702 shown in FIG. 33 may include both a nonvolatile memory such as a ROM or the like and a volatile memory such as a dynamic random access memory (DRAM) or the like.

A display controller 703 is a dedicated controller for processing draw commands issued by the CPU 701. The draw data processed by the display controller 703 is temporarily written in, for example, a frame buffer (not shown), and is then outputted on a screen by a display 708. For example, a picture reproduced from the HDD 711 or a picture processed by the CPU 701 is displayed on the screen of the display 708, and a user can view the displayed picture. An input device interface 704 is a device for connecting user input devices such as a keyboard 709, a mouse 710 and the like to the picture processing apparatus 700. The user can input commands for processing or displaying pictures or the like through the keyboard 709 or the mouse 710.

The network interface 705 can connect the picture processing apparatus 700 to local networks such as a local area network (LAN) or a wide area network such as the Internet in accordance with a predetermined communications protocol such as Ethernet or the like. In the network, a plurality of host terminals or servers (not shown) are connected in a transparent state to form a distributed computing environment. In the network, it is possible to perform distribution services of software programs, data content and the like. That is, it is possible to distribute and to receive the first layer, the second layer, and the third layer data.

The external device interface 706 is a device for connecting external devices such as a video camera capable of taking 120 frames/sec moving pictures, the HDD 711, a media drive 712 or the like to the picture processing apparatus 700. The HDD 711 is an external storage device in which a magnetic disk is mounted fixedly as a storage medium and is well known in the art. The HDD 711 is superior to other external storage devices in terms of storage capacity, data transfer rate and the like. Moreover, random access to the HDD 711 is also possible. Placing a software program on the HDD 711 in an executable condition is referred to as an installation of the program to the system. Ordinarily, the HDD 711 stores, in a nonvolatile manner, program codes of an OS, application programs, device drivers and the like to be executed by the CPU 701. For example, programs dealing with the above-mentioned picture processing flows (in FIGS. 10, 12, 14 and 16) can be installed on the HDD 711.

The media drive 712 is a device into which portable media such as CDs, MOs, DVDs or the like are loaded in order to access the data recording surfaces thereof. Portable media are mainly used for saving software programs, data files and the like in the form of computer readable data as back-up, and for transferring them between systems, in other words, for selling, distributing, delivering and so forth. Application programs for picture processing can be physically distributed between a plurality of devices by means of such portable media.

Figure 33:
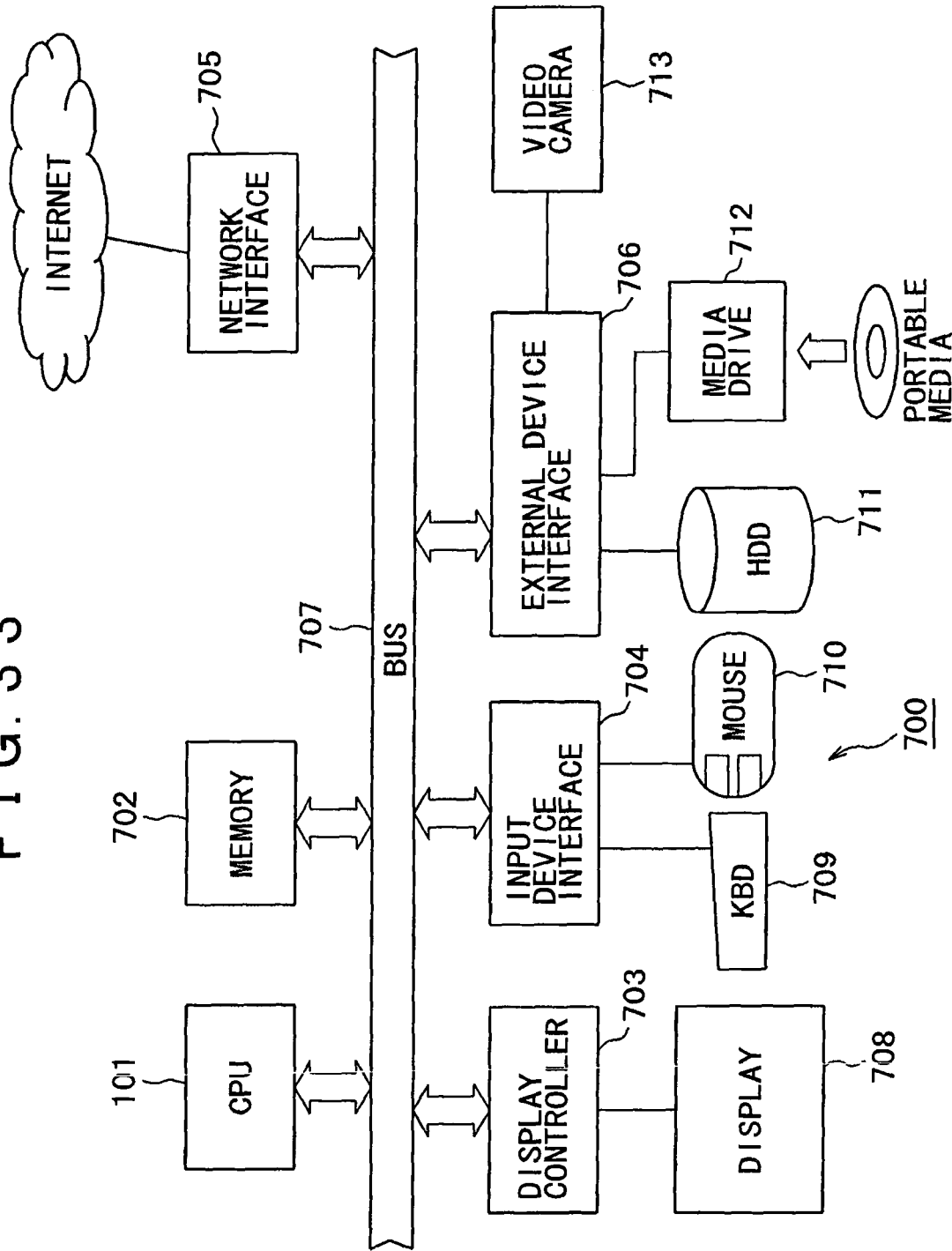
FIG. 33 is a diagram showing a configuration example of a picture processing apparatus according to an embodiment of the present invention.

An example of the picture processing apparatus 700 shown in FIG. 33 would include a compatible or successor machine of the personal computer "Personal Computer/Advanced Technology (PC/AT)" of International Business Machines Corporation. Naturally, it is also possible to use a computer equipped with other architecture as the picture processing apparatus 700 according to the present embodiment.

In the embodiment described above, a configuration example in which compression is performed on the picture data transmitting end and decompression is performed on the picture data receiving end is described. However, the present invention is not limited as such, and it is not essential that the data to be transmitted and received be compressed. In other words, the data of each layer may be transmitted without being compressed.

Hereinabove, the present invention has been described in detail with reference to specific embodiments. However, it should be obvious that the invention disclosed herein may be embodied in other specific forms without departing from the spirit or general characteristics thereof, some of which forms have been indicated. The embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

The series of processes described in the present specification can be executed by hardware, software, or a composite configuration of both. In executing the process through software, a program in which processing sequences are recorded may be installed in a memory within a computer incorporated into a dedicated hardware and be executed, or the program may be installed to a general purpose computer capable of executing various processes and be executed.

For example, the program may be recorded on a hard disk or in a ROM as a storage medium in advance. Alternatively, the program may be temporarily or permanently stored in a removable storage medium such as a flexible disk, a compact disc read only memory (CD-ROM), an MO disc, a DVD, a magnetic disk, a semiconductor memory, or the like. Such removable storage media may be supplied as packaged software.

In addition to being installed to a computer from such removable recording media, the program may be wirelessly transferred to a computer from a download site, or may be transferred to a computer through a network such as a LAN or the Internet, and the computer may receive the program transferred in such a way to install the program on a storage medium such as a built-in hard disk or the like.

The various processes described in the present specification are not limited to being executed chronologically in the listed order, but also may be executed in parallel or individually as necessary, or depending on the processing ability of the apparatus which executes the processing. Moreover, in the present specification a "system" refers to a logically aggregated configuration of a plurality of devices, and each device of the configuration need not reside in the same housing.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image processing apparatus for generating frame data applicable to frame reproduction of differing frame rates, said apparatus comprising:
   a frame conversion unit configured to generate low frame rate frame data by averaging a plurality of temporally continuous frames having high frame rate frame data and obtained at a high frame rate to generate a low frame rate frame, wherein the low frame rate frame data has a same spatial resolution as the high frame rate frame data; and
   a frame selection unit configured to perform a decimation process in which frame data that can be restored or regenerated using said low frame rate frame data is decimated from said high frame rate frame data,
   wherein data of a plurality of layers is set to be said frame data applicable to said frame reproduction of differing frame rates with said low frame rate frame data as lower layer data and data of said high frame rate frame data after decimation as higher layer data.

2. The image processing apparatus according to claim 1, wherein
   said frame conversion unit is configured to generate medium frame rate frame data by composition processing said high frame rate frame data, and generates said low frame rate frame data by composition processing said generated medium frame rate frame data,
   said frame selection unit is configured to perform a decimation process in which frame data that can be restored by means of said low frame rate frame data is decimated from said medium frame rate frame data, and
   said data of a plurality of layers is set to be said frame data applicable to said frame reproduction of differing frame rates with said low frame rate frame data as said lower layer data, data of said medium frame rate frame data after decimation as medium layer data, and data of said high frame rate frame data after decimation as said higher layer data.

3. The image processing apparatus according to claim 1, further comprising a compression unit configured to execute compression processing of said data of said plurality of layers.

4. The image processing apparatus according to claim 1, wherein said frame conversion unit is configured to execute a process of generating frame data $\{B_x\}$ having a low frame rate based on a plurality of temporally continuous frames having high frame rate frame data $\{A_x \text{ to } A_{x+n}\}$ and obtained at said high frame rate through the following formula:

$$B_x = (A_x + A_{x+1}, \ldots + A_{x\pm n})/n.$$

5. The image processing apparatus according to claim 1, wherein the low frame rate frame data corresponds to data generated using a first exposure time and the high frame rate frame data corresponds to data generated using a second exposure time shorter than the first exposure time.

6. The image processing apparatus according to claim 1, wherein the low frame rate frame is calculated by summing a pixel value of each corresponding pixel in the plurality of temporally continuous frames having high frame rate frame data, dividing by a number of the plurality of temporally continuous frames having high frame data, and setting a resulting value as a pixel value for each corresponding pixel in the low frame rate frame.

7. The image processing apparatus according to claim 1, wherein the low frame rate data has a low frame rate equal to a high frame rate of the high frame rate data multiplied by a number of the plurality of temporally continuous frames.

8. An image processing apparatus for generating frame data according to a processable frame rate of a display device based on frame data of a plurality of layers, comprising:
   a frame data restoration unit configured to restore frame data of a high frame rate that has been decimated based on low frame rate frame data included in lower layer data and decimated high frame rate frame data included in higher layer data, wherein a first high frame rate frame is restored based on a low frame rate frame and a second high frame rate frame temporally different than the first high frame rate frame, and wherein the low frame rate frame data has a same spatial resolution as the decimated high frame rate frame data; and
   a selection output unit configured to select and output said decimated high frame rate frame data included in said higher layer data, and said frame data of said high frame rate restored by said frame data restoration unit.

9. The image processing apparatus according to claim 8, wherein said frame data restoration unit is configured to execute a process of restoring, based on said low frame rate frame data included in said lower layer data and decimated medium frame rate frame data included in medium layer data, frame data of a medium frame rate that has been decimated, and of restoring, based on the restored medium frame rate frame data and said decimated high frame rate frame data included in said higher layer data, frame data of said high frame rate that has been decimated.

10. The image processing apparatus according to claim 8 further comprising a decompression unit configured to execute decompression processing of said data of said plurality of layers.

11. The image processing apparatus according to claim 8, wherein the low frame rate frame data corresponds to data generated using a first exposure time and the high frame rate frame data corresponds to data generated using a second exposure time shorter than the first exposure time.

* * * * *